(12) United States Patent
Eskridge et al.

(10) Patent No.: US 9,415,754 B2
(45) Date of Patent: Aug. 16, 2016

(54) USER DISPLAY PROVIDING OBSTACLE AVOIDANCE

(71) Applicants: Thomas Eskridge, Gulf Breeze, FL (US); Matthew Johnson, Pensacola, FL (US); Chua Wei Liang Kenny, Singapore (SG)

(72) Inventors: Thomas Eskridge, Gulf Breeze, FL (US); Matthew Johnson, Pensacola, FL (US); Chua Wei Liang Kenny, Singapore (SG)

(73) Assignee: Florida Institute for Human and Machine Cognition, Inc., Pensacola, FL (US)

( * ) Notice: Subject to any disclaimer, the term of this patent is extended or adjusted under 35 U.S.C. 154(b) by 603 days.

(21) Appl. No.: 13/705,560

(22) Filed: Dec. 5, 2012

(65) Prior Publication Data
US 2014/0152822 A1    Jun. 5, 2014

(51) Int. Cl.
*G05D 1/02* (2006.01)
*B60T 7/22* (2006.01)
*G05D 1/00* (2006.01)

(52) U.S. Cl.
CPC ............... *B60T 7/22* (2013.01); *G05D 1/0038* (2013.01); *G05D 1/024* (2013.01); *G05D 1/0246* (2013.01); *G05D 1/0255* (2013.01); *G05D 2201/0207* (2013.01)

(58) Field of Classification Search
CPC ... G05D 1/0033; G05D 1/0038; G05D 1/024; G05D 1/0246; G05D 1/0255; G05D 2201/0207; B60T 7/22
See application file for complete search history.

(56) References Cited

U.S. PATENT DOCUMENTS

| | | | |
|---|---|---|---|
| 2003/0216834 A1* | 11/2003 | Allard | B25J 9/1689 700/245 |
| 2005/0073433 A1* | 4/2005 | Gunderson | B60Q 9/006 340/903 |

OTHER PUBLICATIONS

Borenstein et al., "Real-time Obstacle Avoidance for Fast Mobile Robots in Cluttered Environments," Reprint of Proceedings of the 1990 IEEE International Conference on Robotics and Automation, Cincinnati, Ohio, May 13-28, 1990, pp. 572-577.*

Borenstein, "Real-time Obstacle Avoidance for Fast Mobile Robots in Cluttered Environments," Reprint of Proceedings of the 1990 IEEE International Conference on Robotics and Automation, Cincinnati, Ohio, May 13-28, 1990, pp. 572-577.*

* cited by examiner

*Primary Examiner* — Thai Tran
*Assistant Examiner* — Christopher T Braniff
(74) *Attorney, Agent, or Firm* — J. Wiley Horton

(57) ABSTRACT

A visual display for use by a user for navigation and obstacle avoidance. A typical user employs the invention in operating a vehicle. The display may include a conventional video feed. A visual arch metaphor is also provided. A ranging device mounted on the vehicle collects ranging data around the vehicle. As an example, the ranging device might collect 180 degrees of ranging data extending from the vehicle's left side, across the vehicle's front, and over to the vehicle's right side. The ranging data is correlated to a predefined color scale. The ranging data is also correlated to a position on the arch metaphor.

8 Claims, 26 Drawing Sheets

| DEPICTION | RANGE | ACTUAL DISPLAY |
|---|---|---|
| ● | 0.0-0.2m | BLACK |
| ◐ | 0.2-0.6m | 83% GRAY |
| ◐ | 0.6-1.0m | 67% GRAY |
| ◐ | 1.0-1.8m | 50% GRAY |
| ◐ | 1.8-2.6m | 33% GRAY |
| ◐ | 2.6-4.2m | 17% GRAY |
| ○ | 4.2m + | WHITE |

FIG. 8

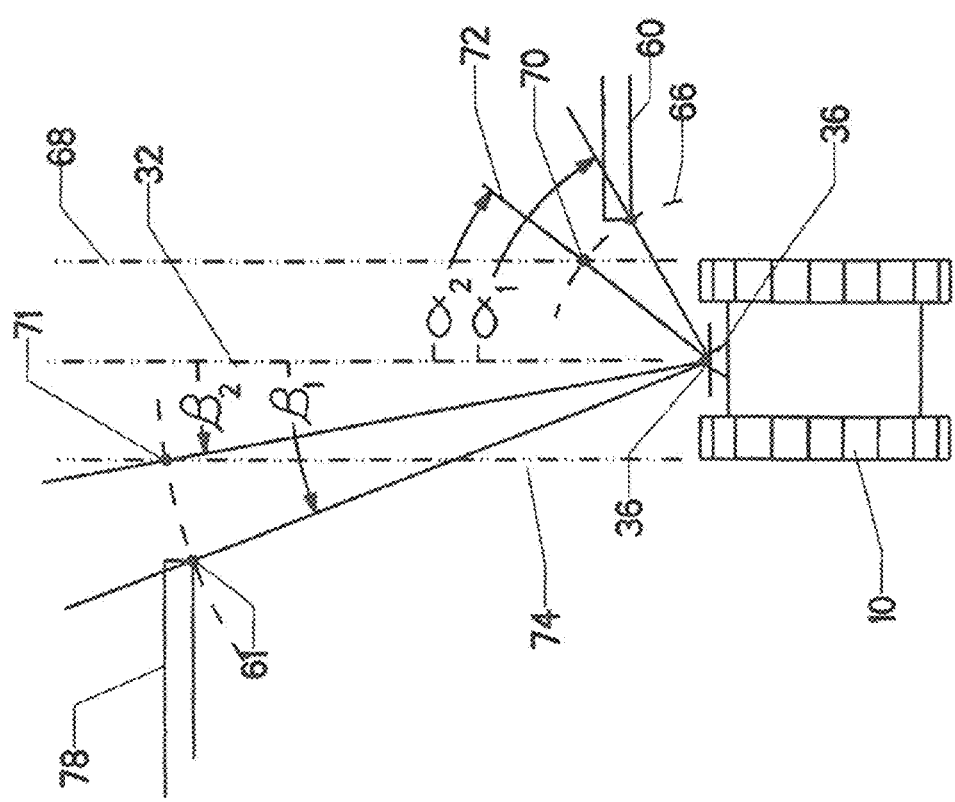

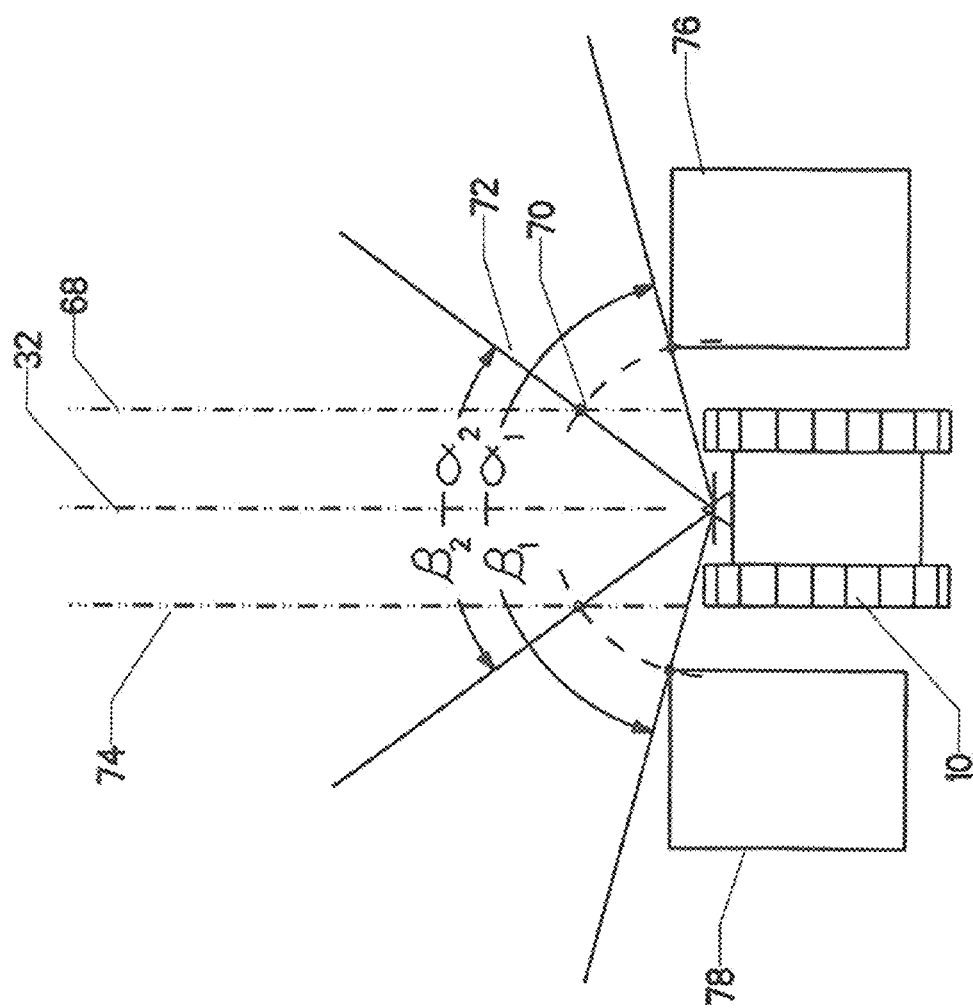

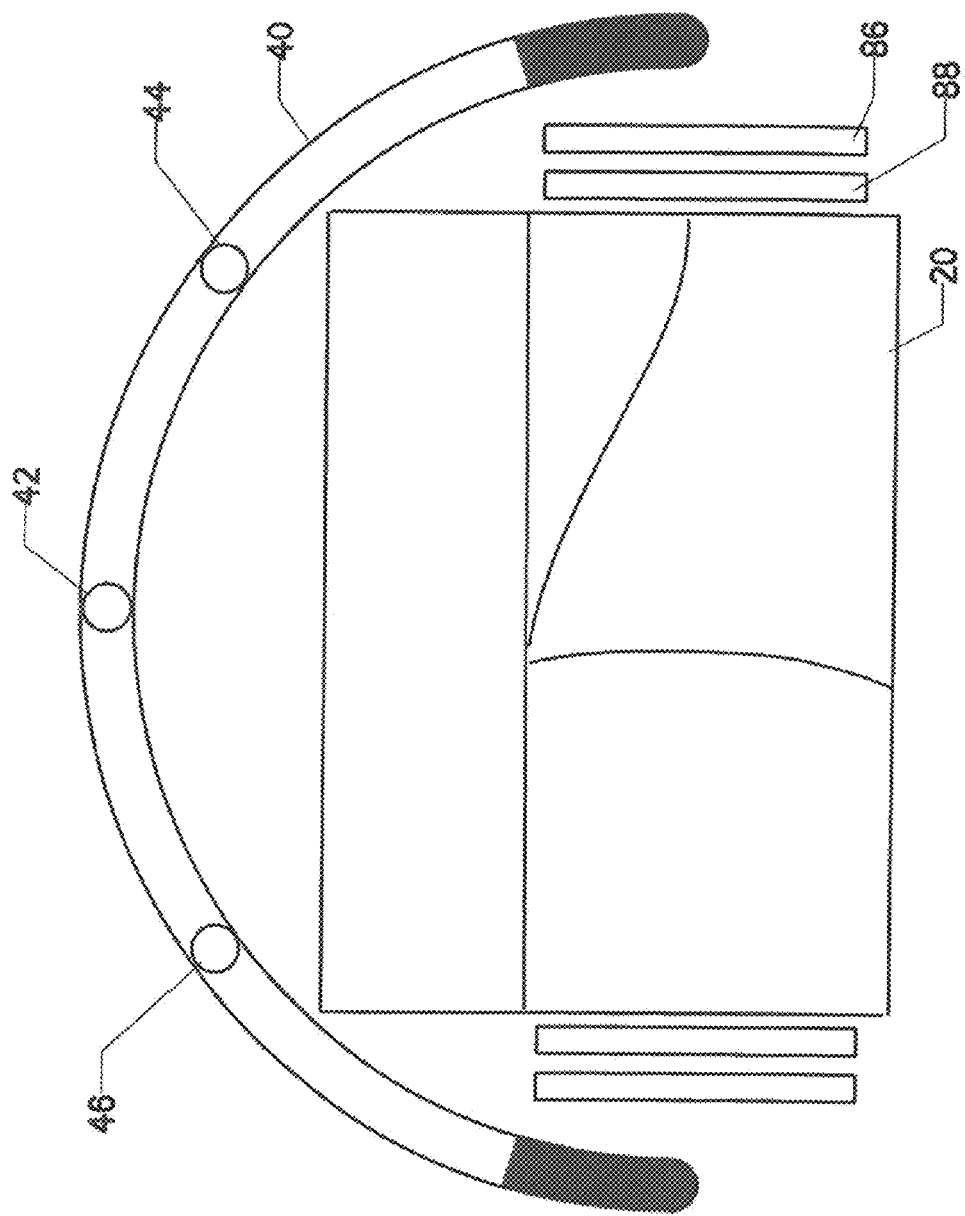

USER DISPLAY PROVIDING OBSTACLE AVOIDANCE

CROSS-REFERENCES TO RELATED APPLICATIONS

Not Applicable.

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

This invention relates to the field of navigation. More specifically, the invention comprises a user interface providing information about obstacles in the users environment.

2. Description of the Related Art

The present invention is suitable for use in the operation of a wide range of applications where a user is maneuvering around obstacles. It is particularly advantageous in cases where peripheral vision is limited. For example, the system may be used to assist the driver of an armored vehicle such as a tank. As a second example, the invention is useful in the operation of passenger vehicles, where the invention assists the driver in staying in the proper lane and maintaining traffic separation. Another useful application is the operation of remotely operated vehicles, where the operator's view may be limited by the orientation of a particular sensor or the vehicle itself. All the examples described in detail involve remotely operated vehicles. However, the reader should bear in mind that the invention may be applied to other fields of endeavor. As an example, the invention may be used to assist a firefighter maneuvering on foot.

FIGS. 1-5 illustrate a situation that is commonly encountered when a user operates a remotely controlled vehicle. FIG. 1 depicts a very simplistic remotely operated vehicle—robot 10. Chassis 16 is propelled by a right track 12 and left track 14. The speed and direction of each track may be individually controlled, thereby providing a wide range of desirable motions. Video camera 18 captures and transmits a live feed of the terrain in front of robot 10. The video feed is provided to a remote operator. The operator is able to transmit commands to control the motion of the robot to achieve a desired result.

The use of a video feed provides a great deal of information to a skilled operator. However, it is also limited in several significant ways. FIG. 2 presents a situation where robot 10 is being maneuvered to avoid obstacles in its path. Walls 22 and 24 meet at corner 26. Opening 28 is located in wall 22. The remote operator can see opening 28 via the live video feed. However, the video feed provides limited depth perception.

FIG. 3 depicts the view a remotely-located operator might see on a video display. Video display 20 depicts all the critical features in the robot's surrounding (wall 22, wall 24, corner 26, and opening 28). However, limited range and dimensional information is provided. The information that is available must be judged by relative sizes, which relies heavily on operator experience. As a result, it is often difficult for even experienced operators to tell how large opening 28 is. For instance, the operator may perceive that opening 28 is a small opening in a wall that is very close to robot 10. The operator may also perceive that opening 28 is a large opening in a wall that is quite far away.

For a human being standing in the position of robot 10, this ambiguity would be resolved via binocular vision and other cues (such as parallax created by head movement). It is possible to provide two cameras on the robot in order to create a parallax effect that can be used to drive 3D-simulating viewing devices. However, these systems are complex and somewhat cumbersome to use. Most remotely operated vehicles only provide a single video feed. Additionally, the precision provided by binocular vision systems, whether human or camera-based, is often insufficient to judge low-margin openings.

Another significant limitation of relying on a video feed is the camera's field of view. FIG. 4 shows a plan view of robot 10 confronting the same obstacles depicted in FIGS. 2 and 3. The operator cannot see beyond the arc denoted as camera field of view 30. Central axis 32 is a line drawn through the robot's center and extended forward. In the embodiment shown, video camera 18 is centered on central axis 32. Thus, camera field of view 30 extends equally to either side of central axis 32.

The field of view depicted is actually fairly wide. However, it cannot show objects that are immediately adjacent to the robot's right and left forward extremities. The location of such objects is particularly important when attempting to maneuver a robot through opening 28. The operator cannot easily tell when the robot has passed through the opening, nor can the operator tell whether adequate clearance has been maintained on either side.

Prior art devices have recognized the shortcomings inherent in the use of video alone. Prior devices have augmented the video feed with other sensory data. FIG. 5 shows one such device. In FIG. 5, ranging device 36 has been placed on the front of the robot. A "ranging device" is any device that can accurately determine a range from a vehicle to an object. Most such devices determine a range along a vector originating at the ranging device itself. The emitter shown in FIG. 5 is able to scan a 180 degree arc, extending from the left side of the robot to the right side of the robot (ranging field of view 34). Other ranging devices may scan a 270 degree arc or a 360 degree arc. The data retrieved is typically fed to a computing device that then determines the position of numerous data points 38. These data points may then be depicted on a display such as shown in FIG. 5.

The plotting of data points 38 may be better than the video feed alone, but it does not provide readily-integrated information to the operator. The operator's attention will generally be focused on the video feed, as it will be the basic tool for target identification, situational awareness, obstacle identification, etc. An effective user interface would preferably exploit the natural operation of human visual processing. It is now recognized that human visual processing occurs in two parallel channels. These are generally referred to as the focal channel and the ambient channel. The focal channel is used when a person focuses on a single specific object. The ambient channel monitors the surrounding scene in a much broader way. Both channels process information simultaneously. The video display customarily occupies the focal channel. It would be advantageous to provide a user interface that utilizes the ambient channel as well. The present invention uses both channels.

BRIEF SUMMARY OF THE PRESENT INVENTION

The present invention comprises a visual display for use by a user navigating an environment containing obstacles. The user may be holding the display on a pad or tablet device, viewing the display as part of a console, or wearing the display in a helmet or visor. The invention is particularly useful for an operator of a vehicle. The operator may be located in the vehicle but will more typically be remotely located. The display may include a conventional video feed. A visual arch metaphor is also provided. If used in conjunction with a video feed, the arch metaphor preferably extends from the left side of the video, over the top of the video, and on to the right side of the video.

The arch metaphor is designed to be used primarily by the operator's ambient visual channel (though in some instances the operator may focus on the elements within the arch metaphor). A ranging device mounted on the vehicle collects ranging data around the vehicle. As an example, the ranging device might collect 180 degrees of ranging data extending from the vehicle's left side, across the vehicle's front, and over to the vehicle's right side.

The ranging data is correlated to a color scale. For instance, the color scale could range from white to black, with numerous shades of gray in between. Ranging data indicating close proximity to an object could be correlated to a dark color (with black being very close proximity) while ranging data indicating a far object could be correlated to a light color (with white being very far).

The ranging data is also correlated to a position on the arch metaphor. As an example, ranging data taken from 90 degrees left of the vehicle's centerline could be correlated to the left base of the arch metaphor. Ranging data taken from straight ahead could be correlated to the center of the arch metaphor. Ranging data taken from 90 degrees right of the vehicle's centerline could be correlated to the right base of the arch metaphor.

In use, the arch metaphor presents ranging information in terms of a position along the arch and a color assigned to that position. The operator immediately obtains useful information from this presentation, without having to concentrate on and "read" any particular part of the data.

The invention preferably includes other visual features allowing the operator to intuitively select appropriate headings and quickly determine whether sufficient clearance exists to pass a particular object.

BRIEF DESCRIPTION OF THE SEVERAL VIEWS OF THE DRAWINGS

FIG. 8 is a hatching versus color chart, explaining the hatching used in the present drawings.

FIG. 19A is a plan view showing the robot facing two obstacles.

FIG. 20A is a plan view showing the robot emerging from a passage.

FIG. 20C is a graphical view, showing the arch metaphor, video display, and other supplemental graphics.

Figure 1:
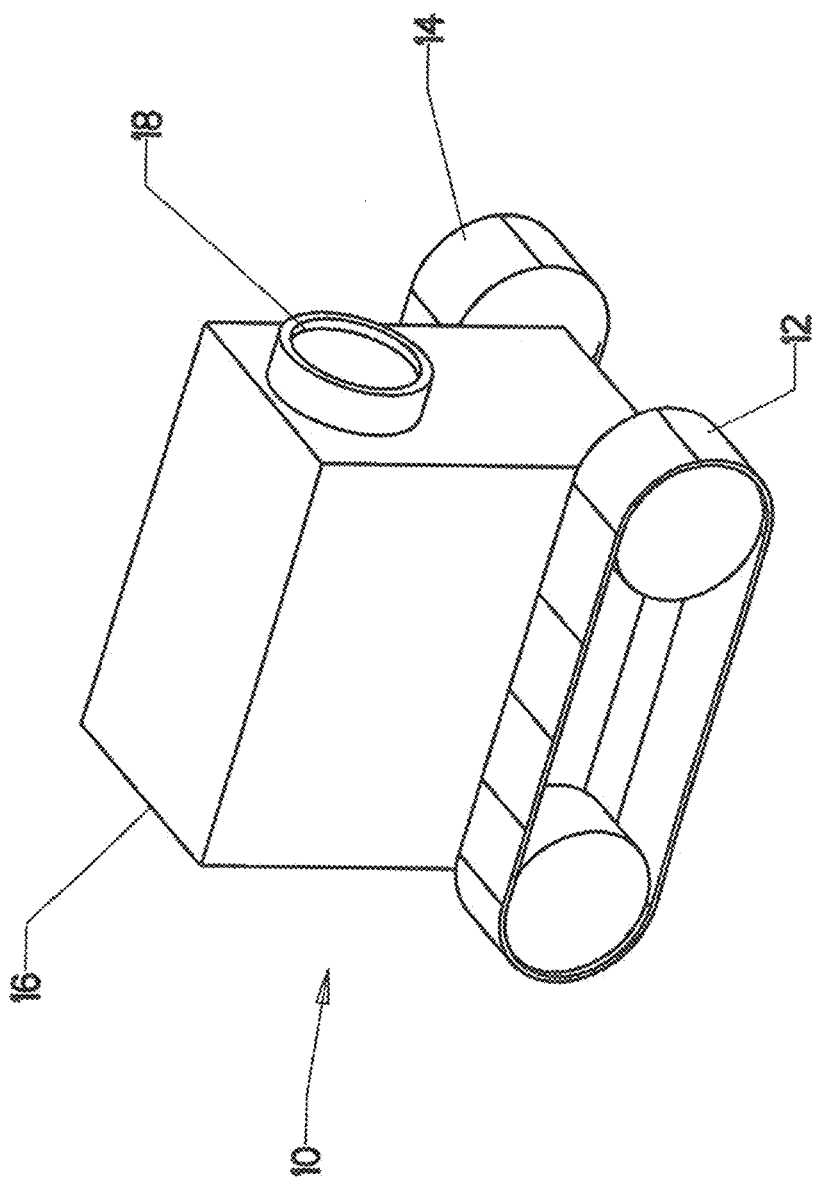
FIG. 1 is a perspective view, showing a simple depiction of a prior art robot.

| REFERENCE NUMERALS IN THE DRAWINGS | |
|---|---|
| 10 robot | 12 right track |
| 14 left track | 16 chassis |
| 18 video camera | 20 video display |
| 22 wall | 24 wall |
| 26 corner | 28 opening |
| 29 opening | 30 camera field of view |
| 32 central axis | 34 ranging field of view |
| 36 ranging device | 38 data points |
| 40 arch metaphor | 42 aiming point indicator |
| 44 right clearance indicator | 46 left clearance indicator |
| 48 object | 50 object |
| 52 object | 54 object |
| 56 object | 58 ranging sector |
| 60 object | 61 closest point |
| 62 closest point | 64 closest range vector |
| 66 range vector arc | 68 projected right boundary |
| 70 right boundary intersection | 71 left boundary intersection |
| 72 right boundary vector | 74 projected left boundary |
| 76 object | 78 object |
| 86 outer proximity bar | 88 inner proximity bar |
| 90 clearance indicator | 92 hashmark |
| 94 edge | |

DETAILED DESCRIPTION OF THE INVENTION

Figure 6:
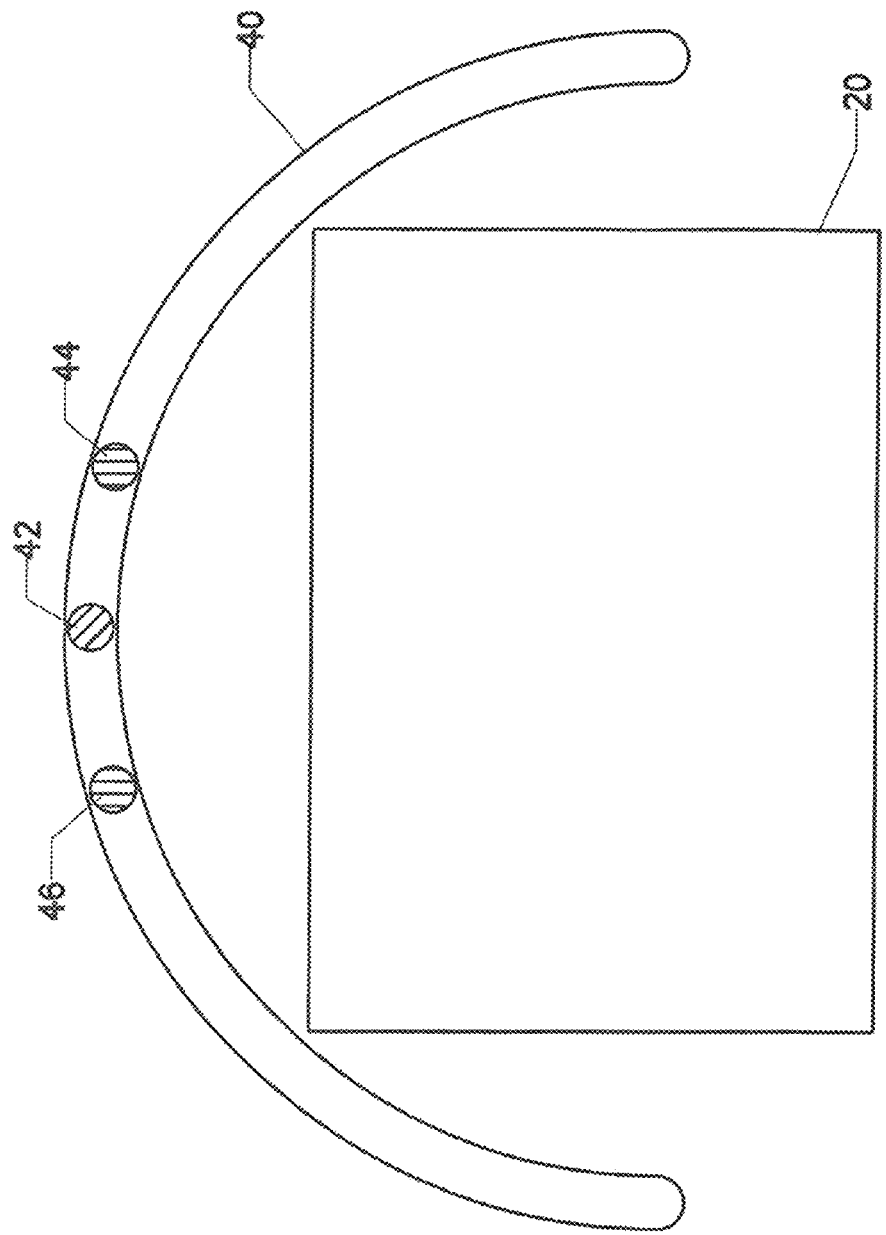
FIG. 6 is a graphical view, showing a user interface display constructed according to the present invention.

FIG. 6 presents a preferred embodiment of the present invention as applied to a moving vehicle. Video display 20 is preferably provided—as for the prior art. Arch metaphor 40 is also provided. The arch metaphor includes a range of moving colors and objects that provide information to the vehicle operator. It is preferably placed as shown—with the arch starting on the left side of the video display, wrapping over the top, and ending on the right side of the video display. The arch metaphor and video display may be shown simultaneously on a single video monitor. It is also possible to provide a separate display for presenting the arch metaphor. However, it is preferable to combine the video feed from the vehicle and the arch metaphor in a single display.

The arrangement wherein the arch metaphor surrounds the video display is preferable as it takes advantage of the previously described focal and ambient visual channels. The operator's focal channel will usually be occupied with the contents of the video display. The arch metaphor is designed to simultaneously engage the operator's ambient channel—though at times the operator may focus on objects within the arch metaphor.

Aiming point indicator 42 remains centered at all times in the middle of the arch metaphor. This represents the present heading of the vehicle. The arch metaphor is driven by a vehicle-based coordinate system, as will be explained. Thus, aiming point indicator 42 never moves. Right clearance indicator 44 is provided to convey information about the position of the vehicle's right side with respect to objects in the environment and the vehicle's rate of movement with respect to those objects. It moves as the vehicle approaches and moves past objects on its right side.

Left clearance indicator 46 is provided to convey information about the position of the vehicle's left side with respect to external objects and the vehicle's rate of movement with respect to those objects. It moves as the vehicle approaches and passes objects lying off its left side.

The three indicators may be represented by any suitable symbology. In the embodiment shown, each indicator is represented by a circle. It is preferable to color-code the three indicators in order to prevent confusion among them. In the example of FIG. 6, aiming point indicator is green whereas the two clearance indicators are red. In studying FIG. 6, the reader will perceive that an operator can focus on images within the video display while still perceiving the movement of right clearance indicator 44 and left clearance indicator 46, as well as other features within arch metaphor 40.

Figure 7:
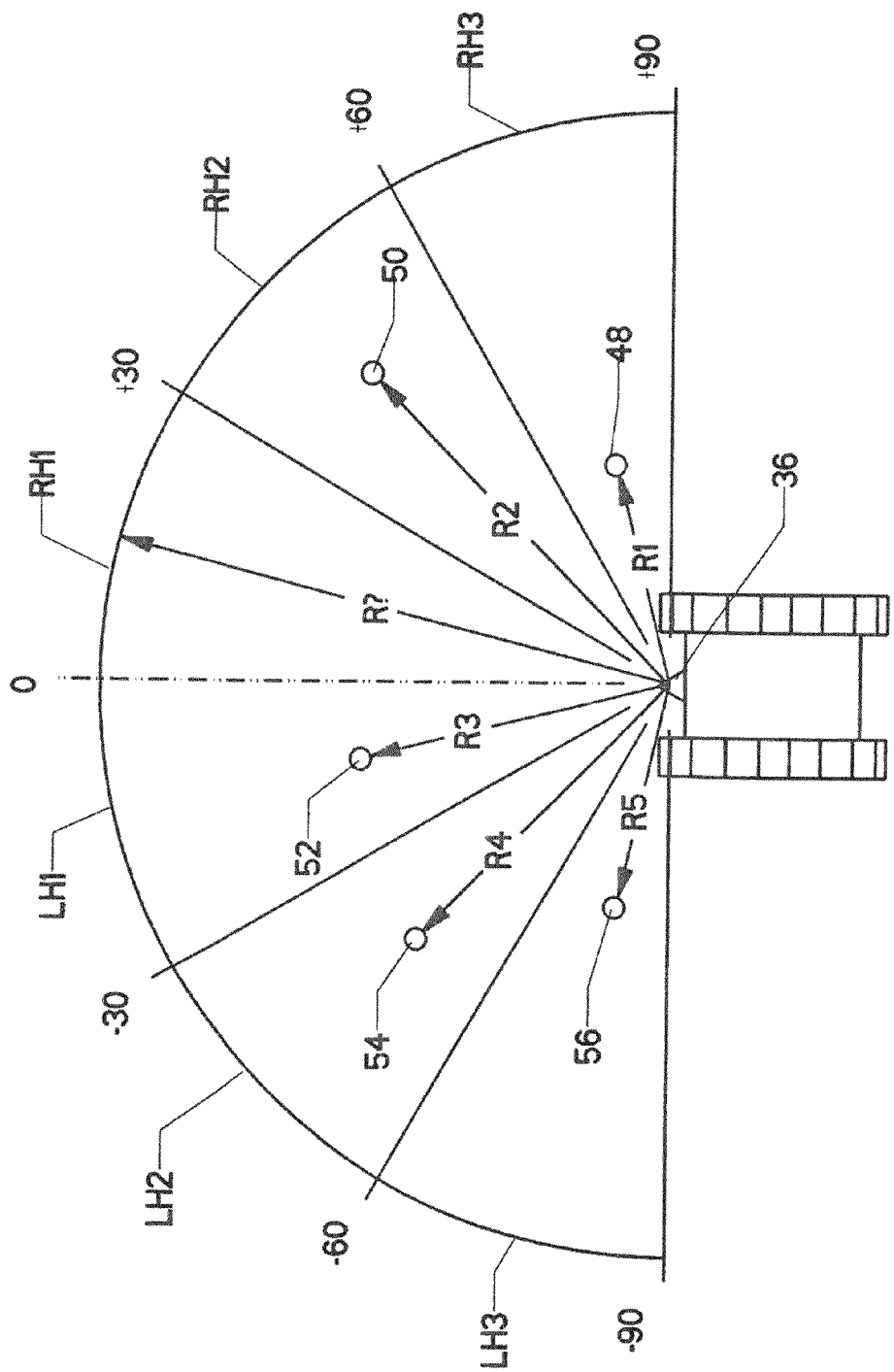
FIG. 7 is a plan view, showing the division of ranging data into six arcuate sectors.
Figure 9:
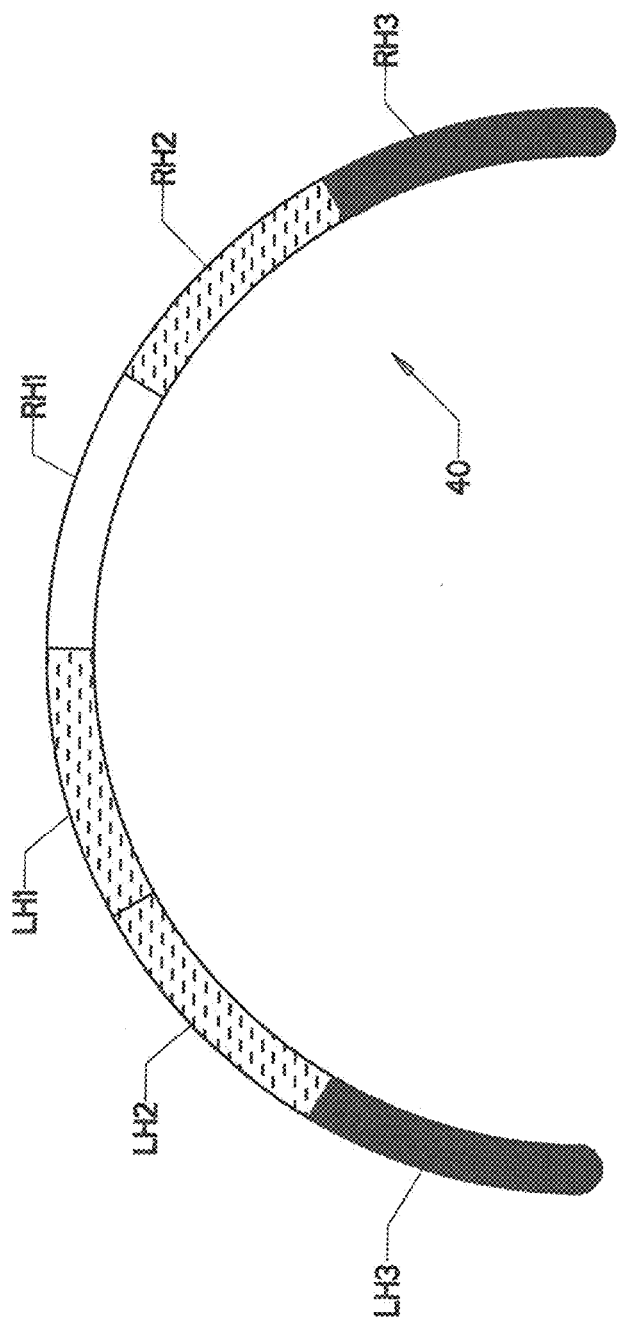
FIG. 9 is a graphical view, showing an embodiment of the present user interface in which only six arcuate sectors are used.

FIGS. 7-9 explain a simple embodiment in which ranging data collected by a vehicle is correlated with the symbols and colors presented in the arch metaphor. This simple embodiment will provide a basis for understanding the more complex embodiments described subsequently. FIG. 7 shows robot 10 having ranging device 36 located on its front. Ranging device 36 is able to scan a 180 degree arc, from −90 degrees to +90 degrees.

It is possible to graphically depict every single piece of ranging data obtained. This may present too much information, however. For example, an arc-minute scanner will produce 10,800 individual measurements for the 180 degree scan. While it is possible to graphically depict each of these, this would create an additional computational and display burden without improving the efficacy of the invention. Thus, it is helpful to simplify the graphical depiction.

In order to simplify the data depiction task, the scanned region is divided into sectors. The 0 degree position reflects a vector drawn straight forward from the robot's centerline. The first and simplest division is to divide the field of view into data lying to the right of the centerline (0 to +90 degrees) and data lying to the left of the centerline (0 to −90 degrees).

This first division is then further subdivided into three sectors, each of which has a width of 30 degrees. The three sectors lying to the right of the 0 degree line are labeled RH1 ("right hand sector 1"), RH2, and RH3. Likewise, the three sectors lying to the left of the 0 degree line are labeled LH1, LH2, and LH3.

One of the main objectives of the present invention is obstacle avoidance. Thus, a primary concern for the operator is identifying which objects are closest to the vehicle. One effective method of sorting the available data is to determine which ranging return is closest to the vehicle within a given sector. This operation is graphically depicted in FIG. 7. Within sector RH3, object 48 is closest to the vehicle and it lies at a distance "R1." Within sector RH2, object 50 is closest and it lies at a distance "R2." Within sector RH1, no object was detected within the limit of the ranging device.

Within sector LH1, object 52 was closest and it lies at a distance R3. Within sector LH2, object 54 was closest and it lies at a distance R4. Within sector LH3, object 56 was closest and it lies at a distance R5.

The arch metaphor graphically depicts ranging data in terms of (1) its radial position with respect to a vehicle-based coordinate system, and (2) its distance from the vehicle. Radial position is preferably shown by a corresponding radial position on the arch metaphor. Distance from the vehicle is shown by the color assigned to a position on the arch metaphor.

The color assignment can be any suitable choice that conveys the desired information to the vehicle operator. One good choice for a color scale is using varying shades of gray. A "gray scale" is often spoken of as varying from 0% gray (white) to 100% gray (black). In this scheme, an object that is quite close to the vehicle would be represented by a black color on that part of the arch metaphor. An object that is quite far away would be represented by a white color on that part of the arch metaphor. Objects in between would be represented by varying shades of gray, with the shade growing proportionally darker according to the nearness of the object.

In order to depict these shades of gray using the acceptable conventions for patent drawings, it is necessary to define a cross-hatching scheme that may be used to represent the shades of gray. FIG. 8 provides a definition for the cross-hatching patterns used in the drawings that follow. The patterns are given definitions other than the standard ones used in the Manual for Patent Examining Procedure of the United States Patent and Trademark Office.

A black region on the arch metaphor is represented as solid block. A region that is 83% gray is represented as a horizontal, dashed pattern as shown in FIG. 8. A region that is 67% gray is represented as a diagonal hatch pattern in which the lines slope upward from left to right. A region that is 50% gray is represented as a vertical hatch pattern. A region that is 33% gray is represented as a diagonal hatch pattern in which the lines slope downward from left to right. A region that is 17% gray is represented as a horizontal hatch pattern. A region that is white is represented as blank.

Each portion of the color scale thus defined is assigned to a segment of the possible ranging data. The term "segment" in this context refers to a portion of the possible values for range. As an example, the first segment may be defined as ranges between 0.0 and 0.2 m. A second segment may be defined as ranges lying between 0.2 and 0.6 m. These segment definitions are largely arbitrary and will depend greatly on the application. For example, in the case of a small vehicle moving over a small area, the span of ranging data might be 0-50 cm. On the other hand, for a larger vehicle the maximum span might be 0-1.000 m. Further, the span of ranging data need not be divided into segments of equal size. In fact, it will often be desirable to provide smaller-sized segments for the portions closest to the vehicle. FIG. 8 presents representative definitions for the range segments. For example, black is assigned to the segment 0.0-0.2 m. 83% gray is assigned to the range segment 0.2-0.6 m. 67% gray is assigned to the range segment 0.6-1.0 m, and so on.

FIG. 9 shows the resulting display in arch metaphor 40 when the color scale definitions depicted in FIG. 8 are applied to the ranging data depicted in FIG. 7. In this embodiment, each of the sectors shown in FIG. 7 is depicted in the same radial position for the arch metaphor. For example, the segment RH3 occupies the position from +60 degrees to +90 degrees (based on the vehicle-centered coordinate system centered on the front of robot 10). RH3 is likewise depicted in the +60 to +90 degree potion of the arch metaphor in FIG. 9.

Looking back at FIG. 7, the reader will observe that object 48 lies fairly close to the vehicle (inside 0.2 m). Thus, that portion of the arch metaphor is colored black. The reader should note that the entire segment RH3 is given a color according to the closest ranging return that is found in that segment. Thus, even trough some points within segment RH3 may be further than 0.2 m, the entire segment is given a black color code because object 48 lies closer than 0.2 m to the vehicle.

Looking again at FIG. 7, the reader will note that object 50 in segment RH2 lies between 0.2 and 0.6 m from the vehicle. Thus, the corresponding segment of the arch in FIG. 9 is given the color 83% gray. The same system is used to assign a color to each of the six segments shown in arch metaphor 40 in FIG. 9.

The embodiment of FIG. 9 is fairly crude, but it does immediately convey useful information to the vehicle operator. First, the operator learns that objects lie fairly close to either side of the vehicle (both LH3 and RH3 are black). Second, the operator learns that an unobstructed path lies in the segment RH1. If the objective is to continue forward, this information tells the operator (1) Don't make a sharp turn, and (2) Head for the opening in RH1. This type of information is often all an operator actually needs to avoid obstacles in the vehicle's environment. Even the very simple example of FIG. 9 provides this information.

Figure 2:
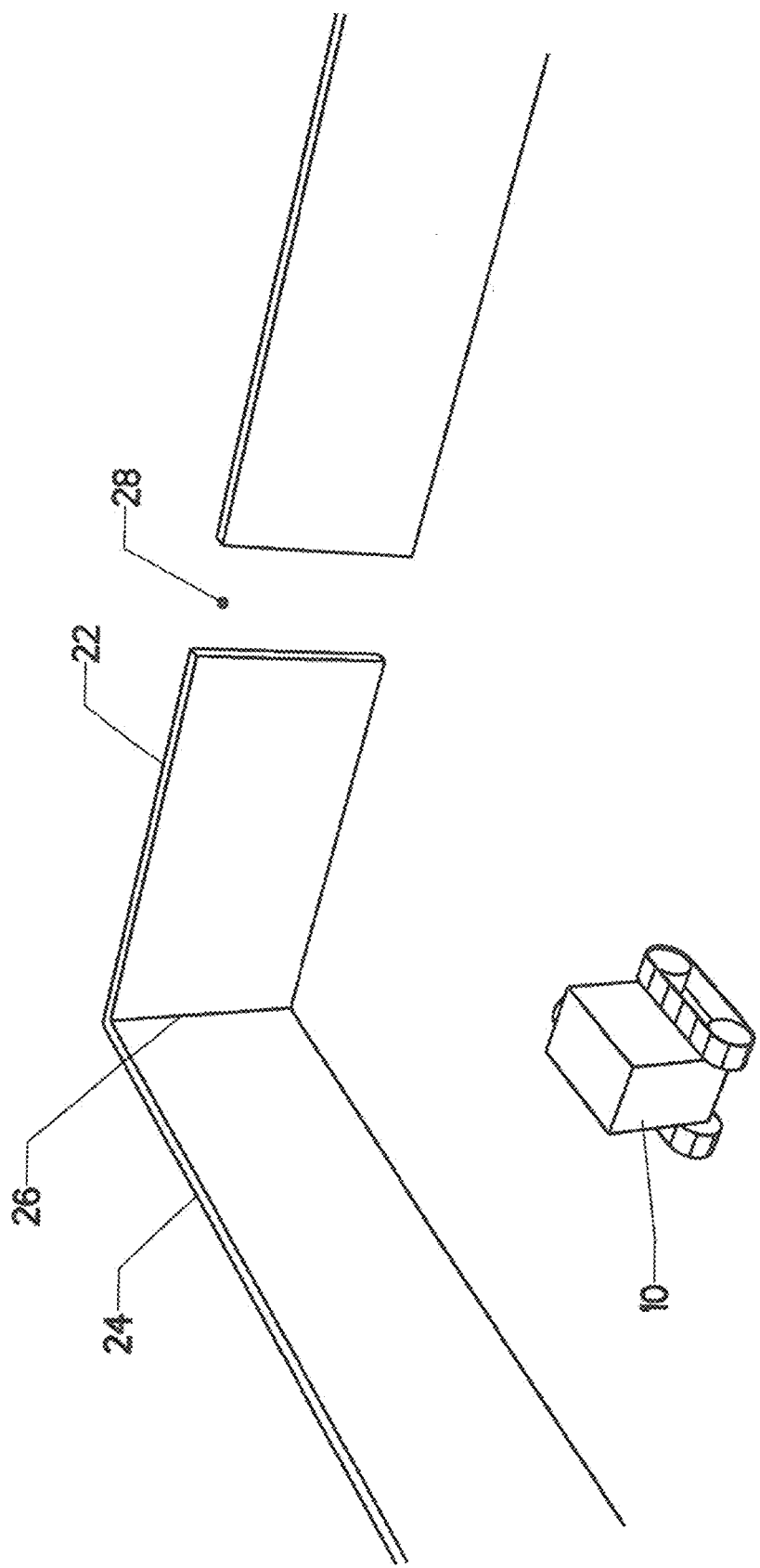
FIG. 2 is a perspective view, showing the robot of FIG. 1 facing several obstacles.
Figure 3:
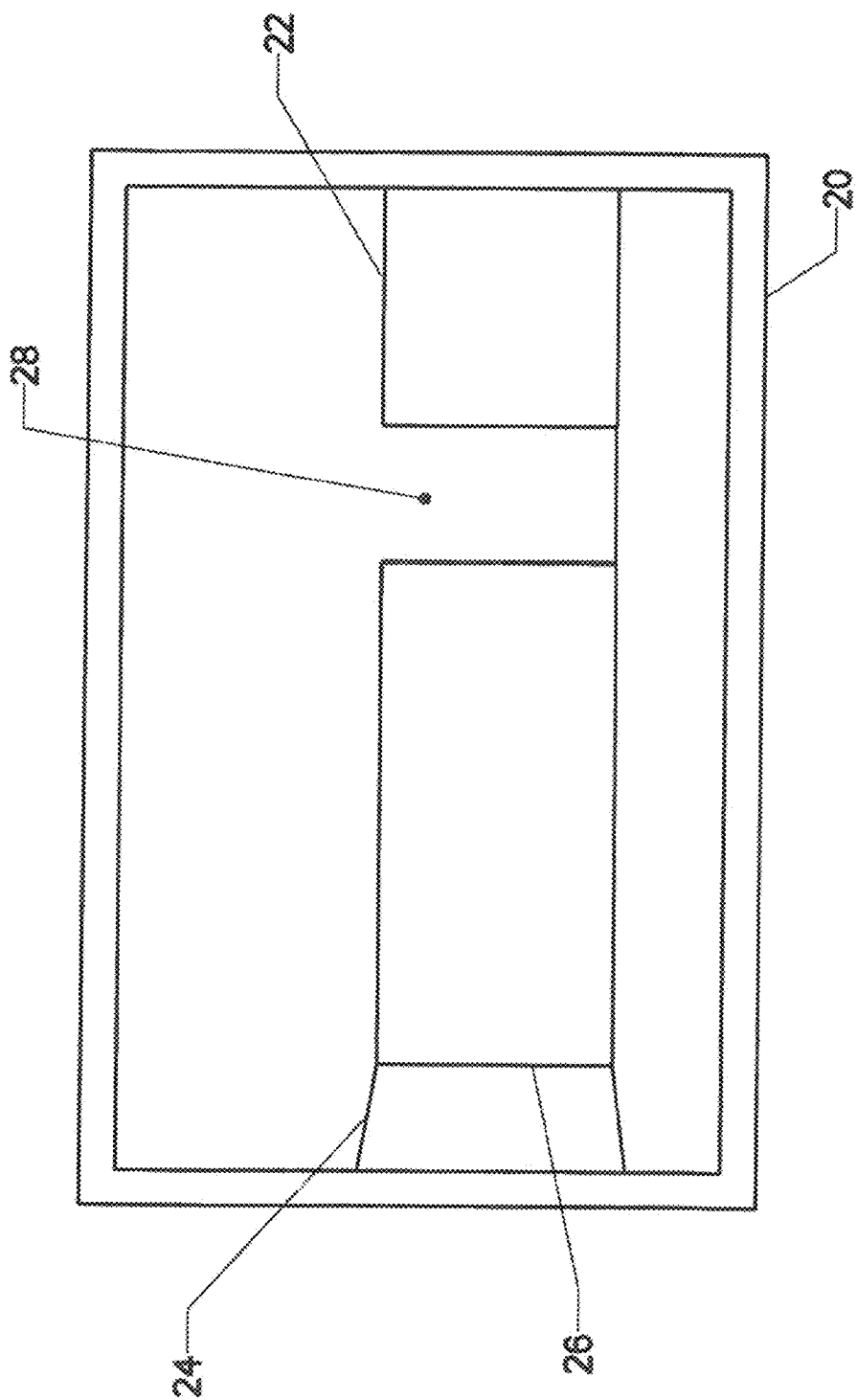
FIG. 3 is an elevation view, showing a prior art video display available to a remote vehicle operator.
Figure 4:
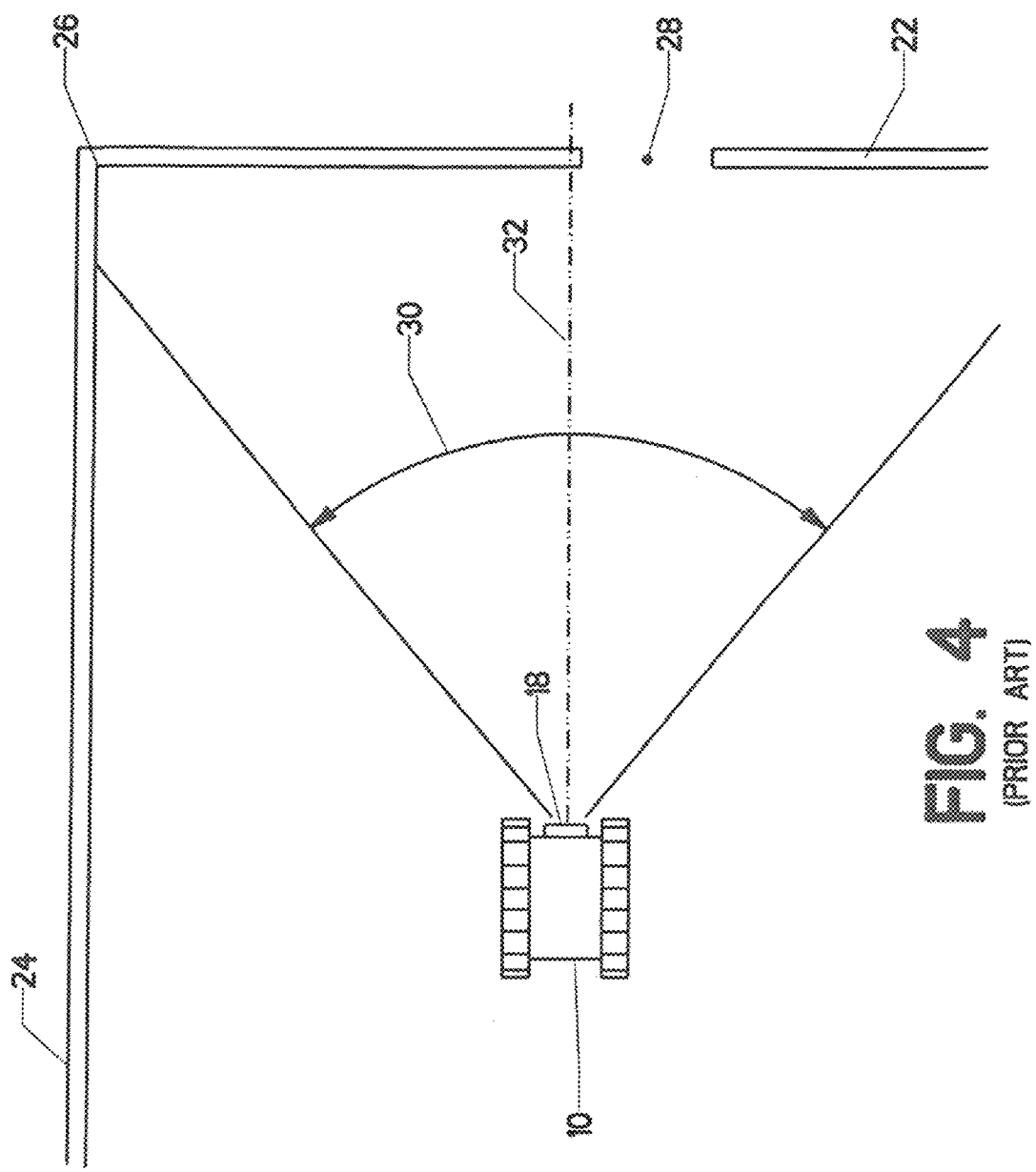
FIG. 4 is a plan view, showing the robot of FIG. 1 in relation to the obstacles it is facing.
Figure 5:
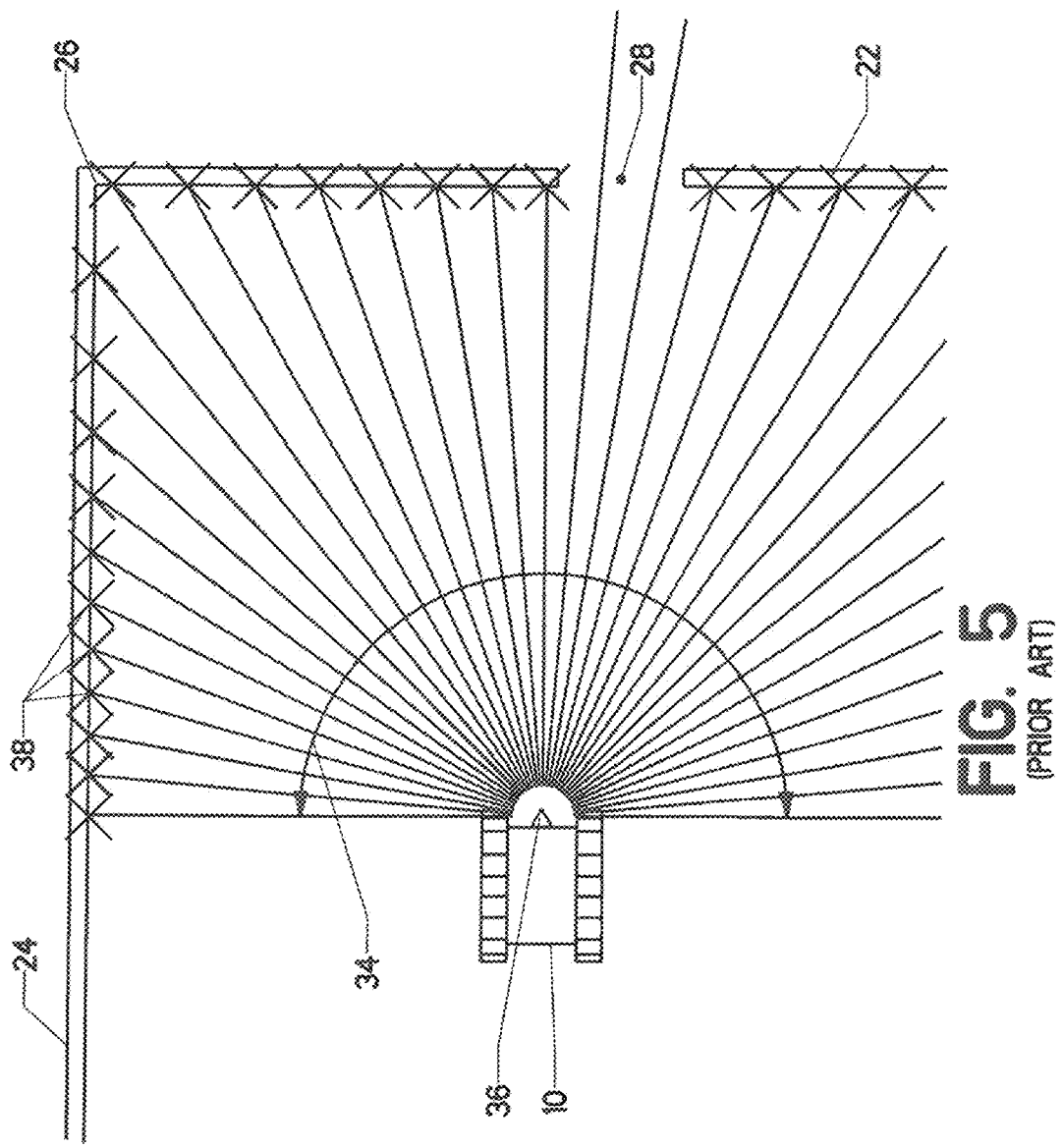
FIG. 5 is a plan view, showing the collection of ranging data points.
Figure 10:
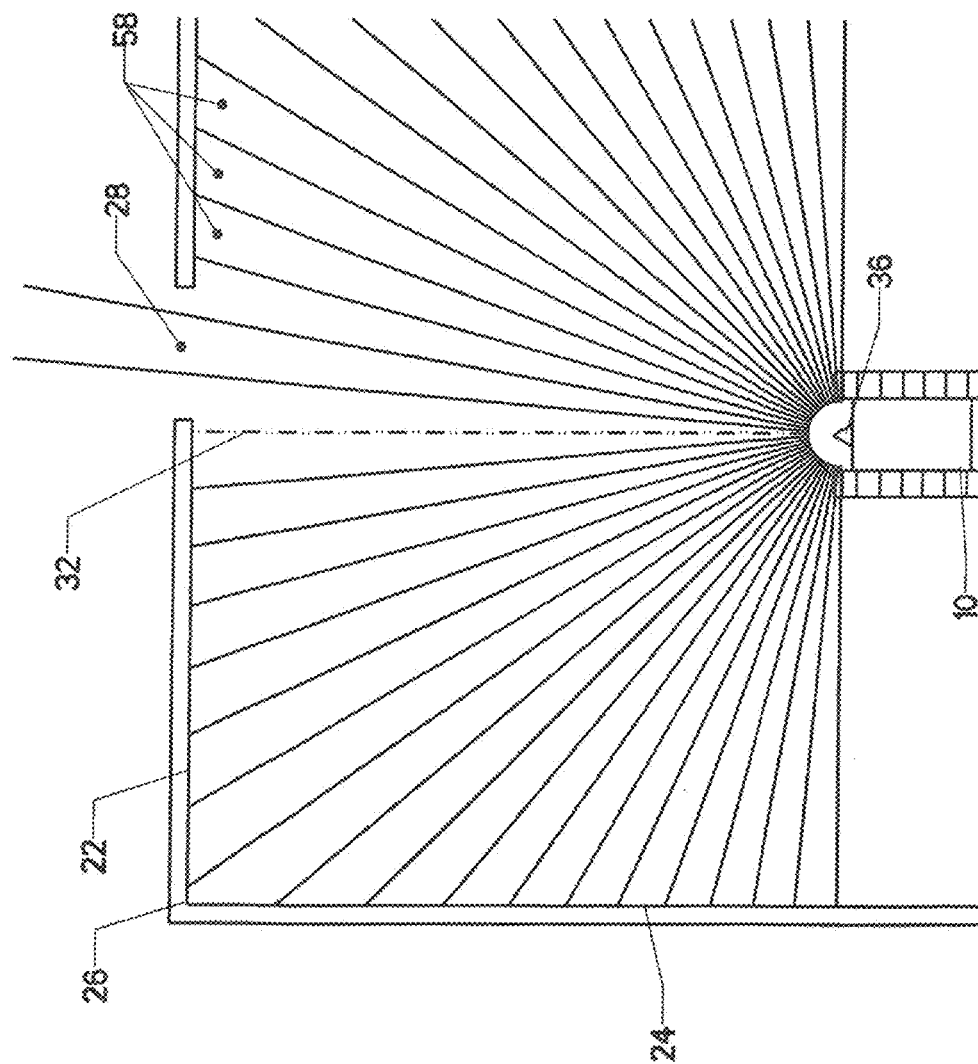
FIG. 10 is a plan view, showing the division of ranging data into thirty-six arcuate sectors.

FIG. 10 shows an embodiment in which the ranging data is divided into 36 radial sectors. Central axis 32 is a line extending forward from the centerline of robot 10. 18 of the defined radial sectors lie to the left of central axis 32 and 18 lie to the right. The robot is facing the same objects depicted in FIG. 2 (wall 24, corner 26, wall 22, opening 28). Within each ranging sector 58 a closest point is found (closest to ranging emitter 36). As for the prior embodiment, this closest point is used to determine the color coding of the portion of the arch metaphor corresponding to a particular ranging sector 58.

Figure 11:
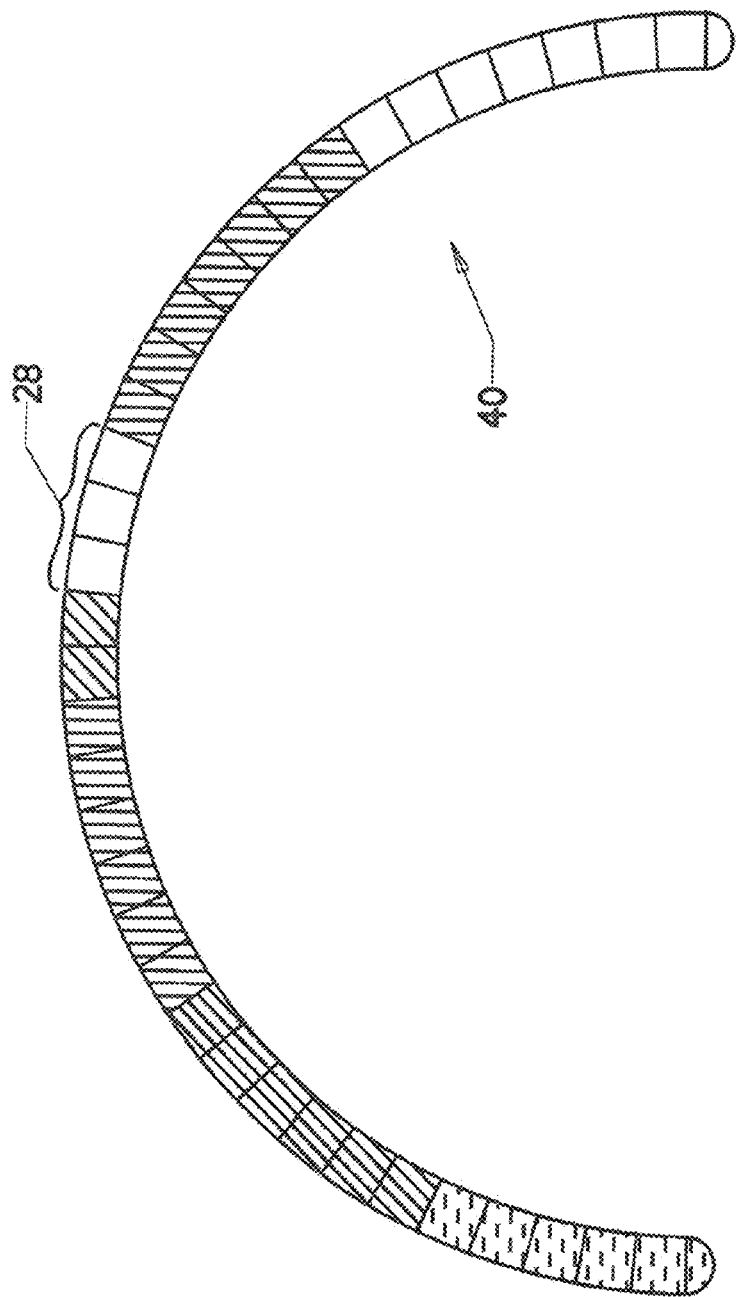
FIG. 11 is a graphical view, showing a representative state of the inventive user interface when thirty-six arcuate sectors are used.

FIG. 11 shows the arch metaphor corresponding to the ranging data shown in FIG. 10. To aid the reader's understanding, the division between each of the 36 radial sectors is actually shown by a line. However, many neighboring sectors are given the same color (since the closest points in the neighboring sectors lie within the same defined range segment). In most embodiments, the dividing lines will not be shown. Thus, the only boundaries visible will occur when the ranging data changes from one of the defined range segments to the next.

There are seven different color regions depicted in arch metaphor 40 of FIG. 11. From left to right these are: 83% gray, 67% gray, 50% gray, 67% gray, white, 50% gray, and white. As most embodiments omit the dividing lines shown in FIG. 11, the only visible divisions would be boundaries between different colors.

Figure 12:
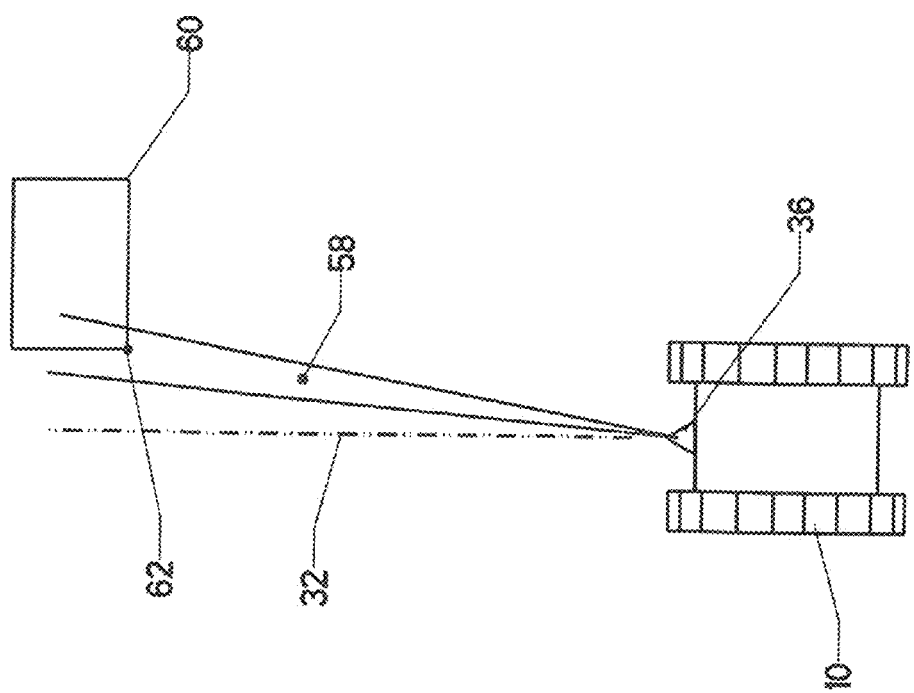
FIG. 12 is a plan view, showing the intersection of a ranging sector with an object.

FIG. 12 shows the typical operation of finding a closest point within each ranging sector. Object 60 has been detected in the path of robot 10. Closest point 62 is detected within ranging sector 58. This closest point is used to define the color assigned to the entirety of the particular ranging sector shown.

FIGS. 13-16 illustrate the motion of the objects and colors within the arch metaphor. In the left side of FIG. 13, robot 10 is moving forward. Object 60 lies off its right side. Ranging device 36 continually scans in front of the robot as it moves. When the scanning data is assimilated, the location of closest point 62 is determined.

One of the objectives of the present invention is to provide graphical display elements that rapidly tell the operator whether the vehicle will clear objects in its path. The left side of FIG. 13 graphically depicts a software operation that makes this determination. It is by no means the only way of making such a determination, but it serves as a good and practical example.

As described previously, central axis 32 is projected forward from the centerline of the robot. Projected right boundary 68 is projected forward from the furthest-extending portion of the robot's right flank. Closest range vector 64 is created between ranging device 36 and closest point 62. Range vector arc 66 is then created. This arc is centered on ranging device 36 and passes through closest point 62. Right boundary intersection 70 is found by intersection projected right boundary 68 with range vector arc 66. Right boundary vector 72 is found by passing a vector from the location of ranging device 36 through right boundary intersection 70.

Figure 13:
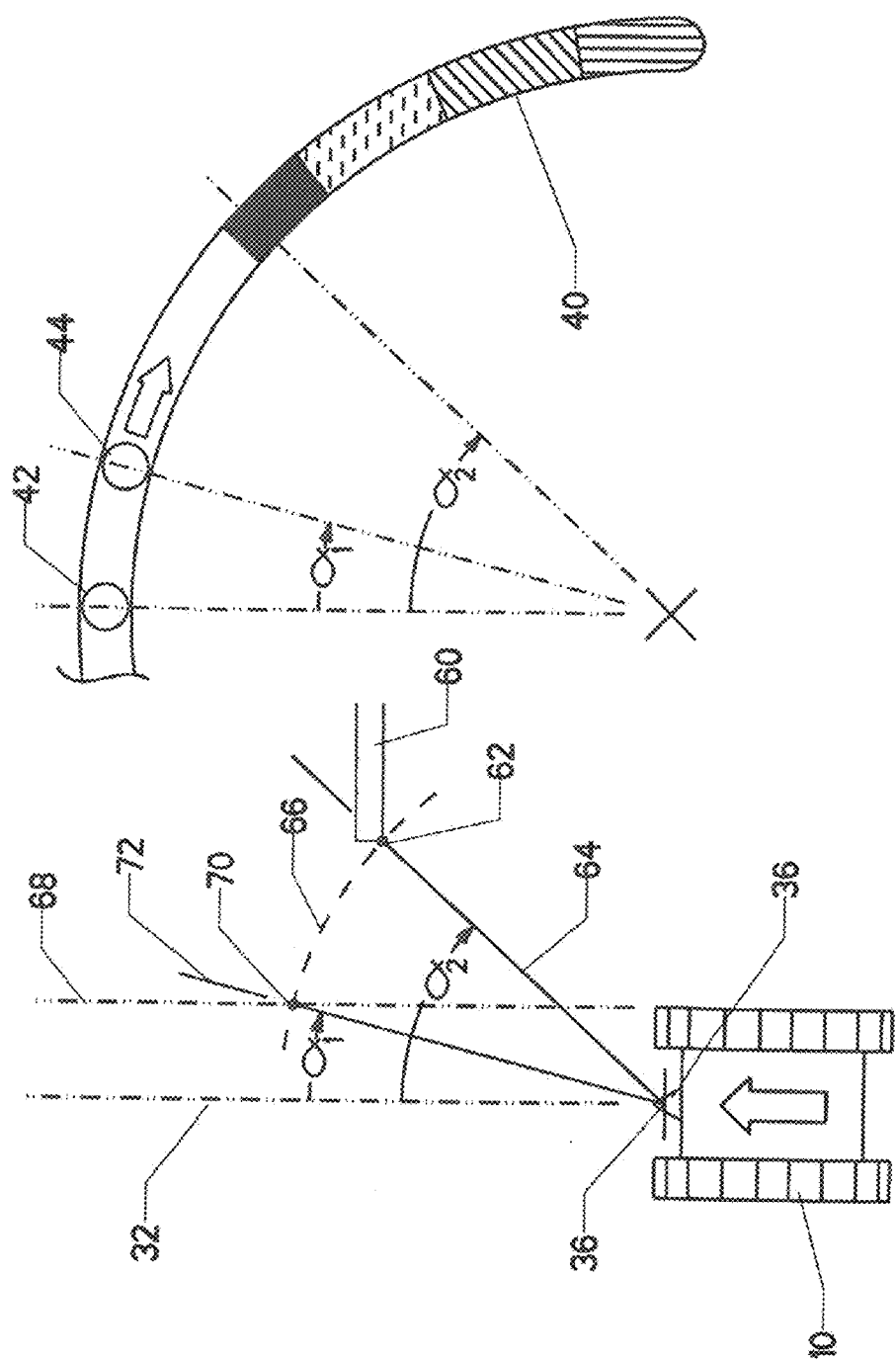
FIG. 13 is a plan view combined with a graphical view, showing how the location of the right clearance indicator is determined in the inventive user interface.

The angle between central axis 32 and right boundary vector 72 is designated as $\alpha_1$. The angle between central axis 32 and closest range vector 64 is designated as $\alpha_2$. The right side of FIG. 13 shows a portion of arch metaphor 40 (the center and right side of the arch metaphor). The symbols shown in the arch metaphor correspond to the scenario shown in the left side of FIG. 13. The central axis and two vectors are carried over to the arch metaphor. Instead of originating with the ranging device, they originate with the center of the arc (indicated by an "X" in the view). The two angles $\alpha_1$ and $\alpha_2$ are shown. The angle $\alpha_1$ is used to determine the location of right clearance indicator 44. The angle $\alpha_2$ is used to determine the sector of the arch that contains the color corresponding to closest point 62.

In this example, closest point 62 is 0.2 m from the robot, and it is therefore color coded black. The reader will note that the start of the black portion of the arc does not precisely correspond with the location defined by the angle $\alpha_2$. This results from the fact that the arch metaphor in this example is subdivided into 36 discrete radial sectors (as shown in FIG. 11). The location defined by the angle $\alpha_2$ falls inside one of the sectors and the color coding is then applied to the entire sector. If a finer partitioning of the arch metaphor is employed (such as using 360 discrete sectors), the discontinuity seen in FIG. 13 would be less noticeable.

However, the reader should realize that most embodiments of the arch metaphor will not usually show the phantom lines or angle designations shown in the right side of FIG. 13. They will instead just show the arch metaphor and included symbology. The discrepancy shown for even a 36-sector embodiment is not significant and would not be noticeable to an operator.

The reader will note the presence of a significant gap between right clearance indicator 44 and the black band indicating the location of closest point 62. This tells the operator that if the robot maintains its present course its right flank will clear object 60. This is apparent from looking at the plan view on the left side of FIG. 13. As long as right clearance indicator 44 remains clear of the nearest dark band on the arch metaphor, the robot has clearance. If, on the other hand, right clearance indicator 44 overlaps with the nearest dark band or in fact passes into it, then there is no clearance.

Looking at robot 10 the reader will observe the arrow indicating that the robot is moving forward. The graphical vectors shown connected to the vehicle are of course based on a vehicle-centered coordinate system. The coordinate system is centered on ranging device 36. The robot appears stationary at all times with respect to this coordinate system. Objects in the surrounding environment—such as object 60—appear to move with respect to the robot. In the scenario of FIG. 13, object 60 appears to move closer to the robot as the robot moves forward.

As this forward motion occurs the angles $\alpha_1$ and $\alpha_2$ will increase. Looking at the arch metaphor, the increasing angles mean that right clearance indicator 44 will move to the right as shown by the arrow. The location of the black band on the arch metaphor will also move to the right.

Figure 14:
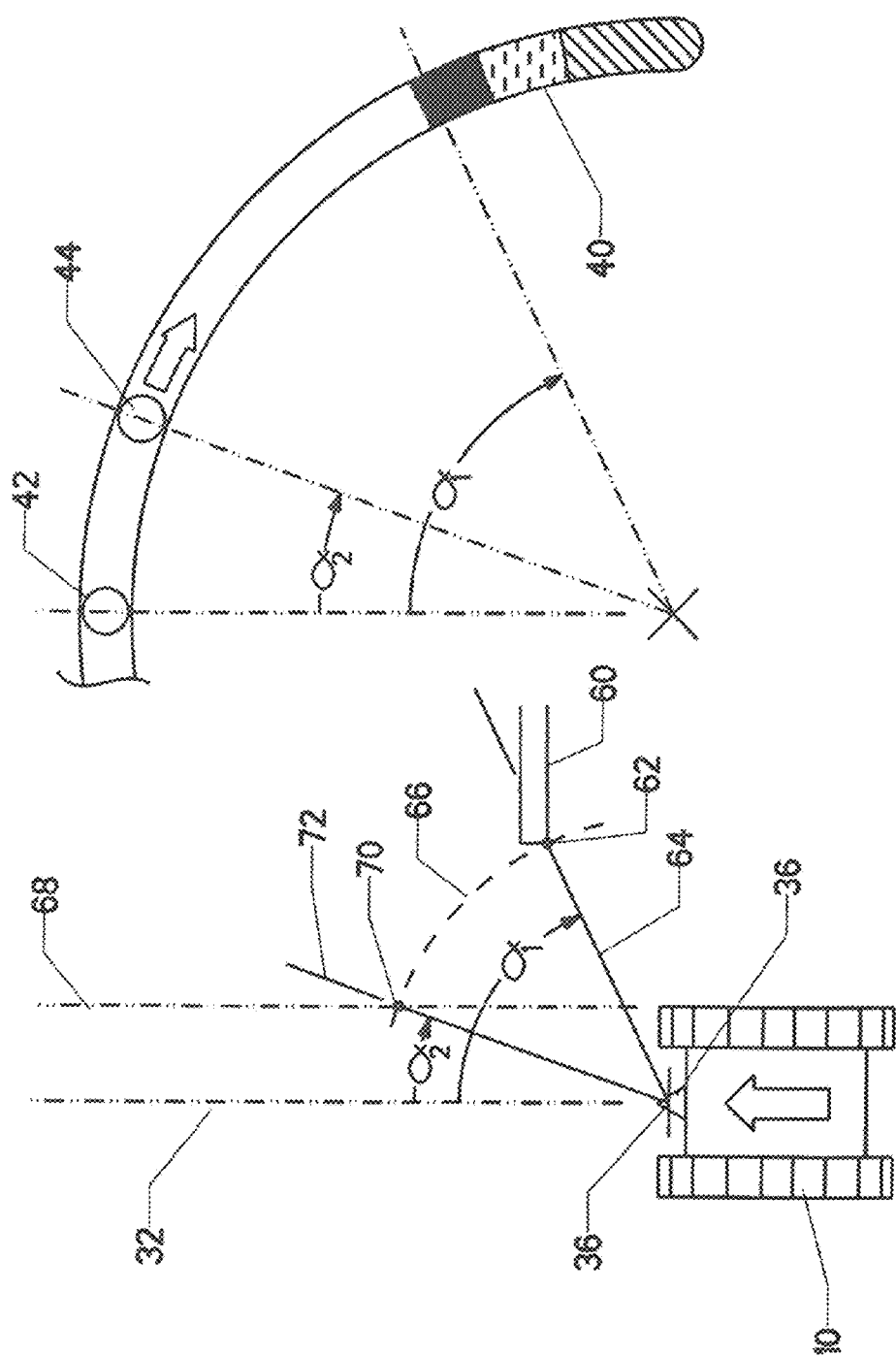
FIG. 14 is a plan view combined with a graphical view, showing how the location of the right clearance indicator is determined in the inventive user interface.

This phenomenon is in fact shown in FIG. 14, which shows a slightly later time. From the standpoint of the vehicle-centered coordinate system, object 60 has now moved closer to robot 10. The angles $\alpha_1$ and $\alpha_2$ have increased. In the arch metaphor, both right clearance indicator 44 and the first dark band have moved further to the right. This motion informs the operator that the robot is transitioning past the obstacle. The fact that right clearance indicator 44 remains well clear of the first dark band informs the operator that the robot will clear the obstacle by a significant margin.

Figure 15:
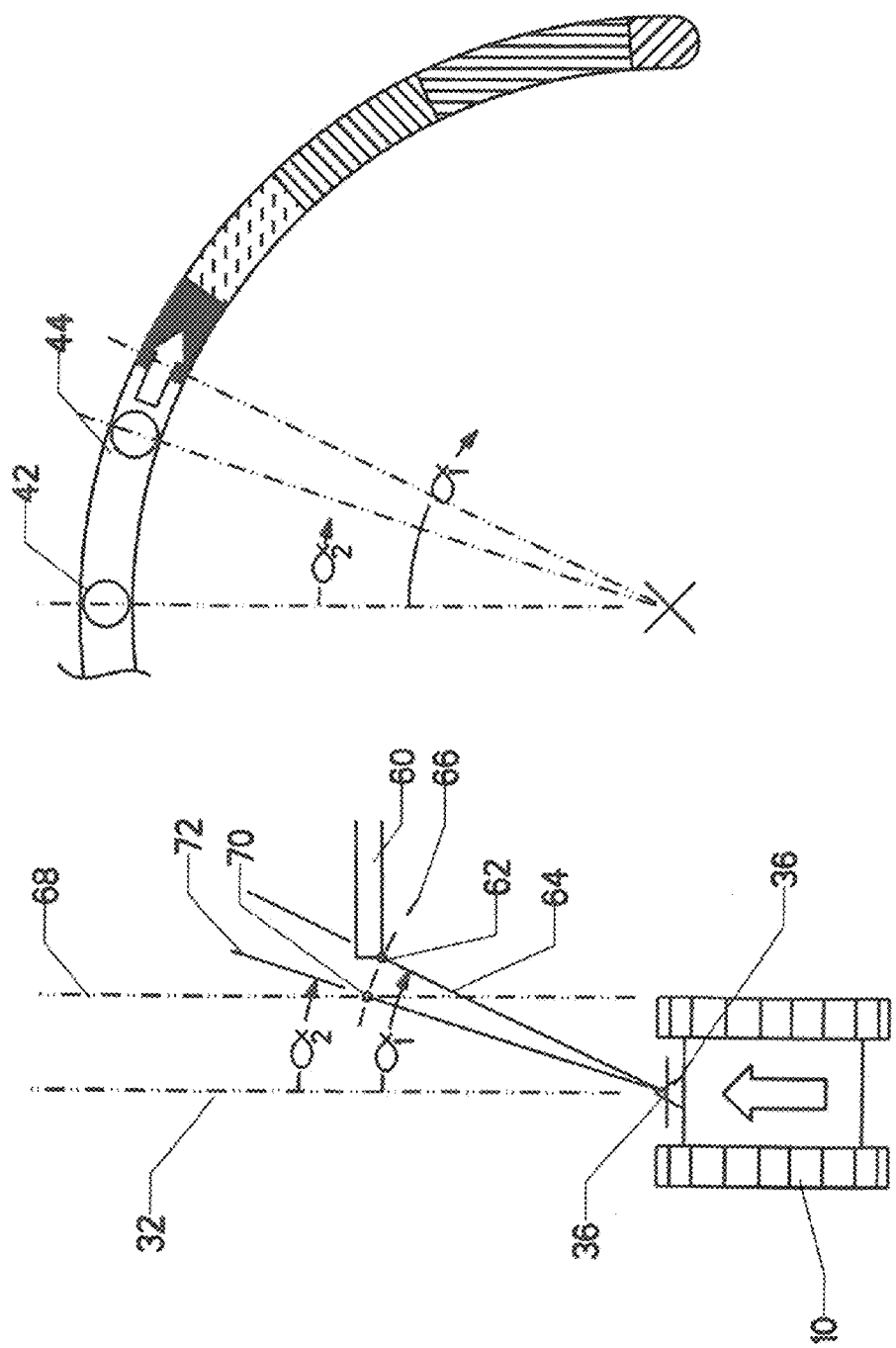
FIG. 15 is a plan view combined with a graphical view, showing how the location of the right clearance indicator is determined in the inventive user interface.
Figure 16:
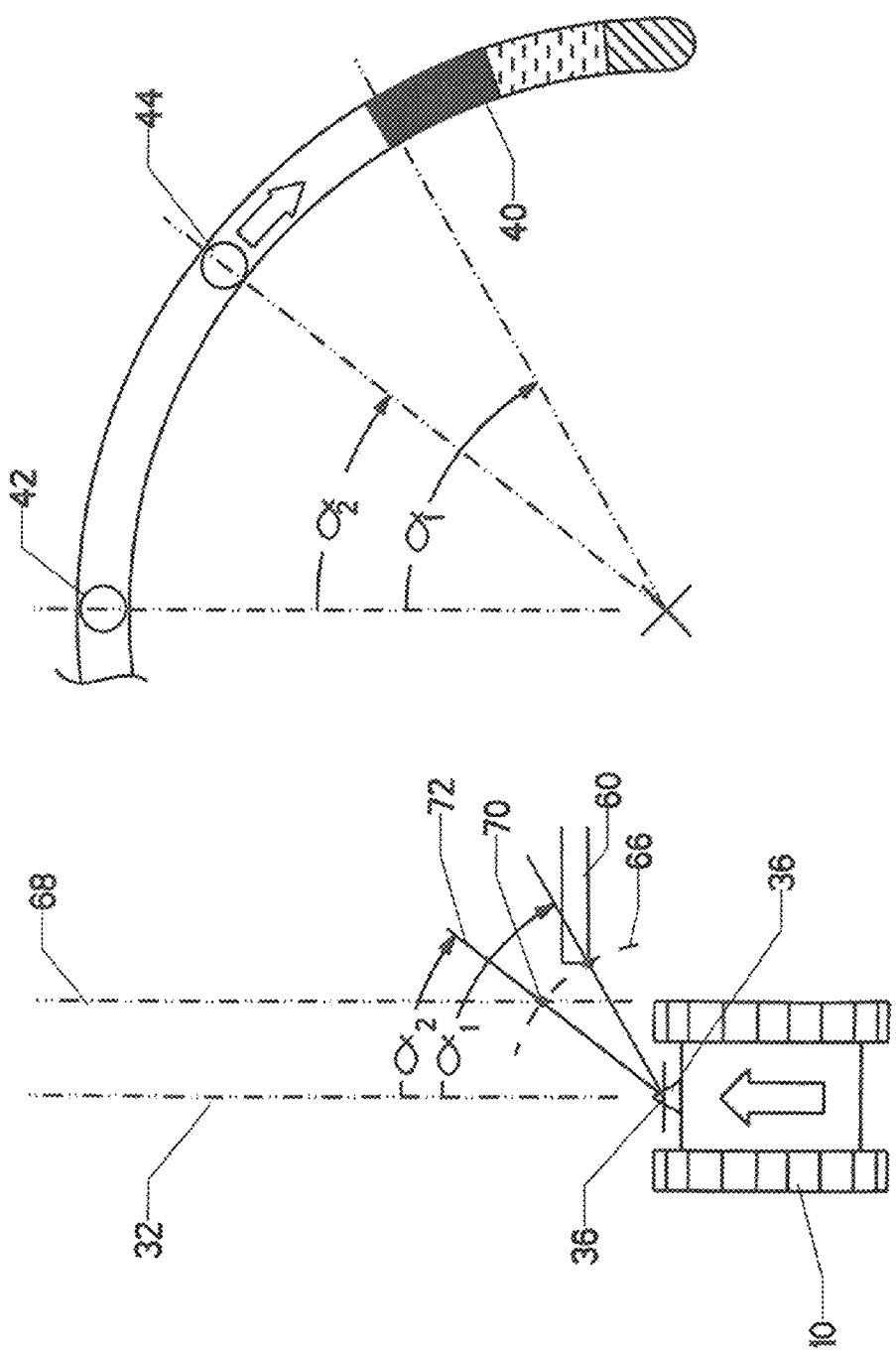
FIG. 16 is a plan view combined with a graphical view, showing how the location of the right clearance indicator is determined in the inventive user interface.

FIGS. 15 and 16 illustrate a similar example in which there is less clearance between the robot and the obstacle it is passing. In the left side of FIG. 15, the reader will note that the robot is again approaching obstacle 60. The reader will also note that projected right boundary 68 passes fairly close to closest point 62. In the arch metaphor, right clearance indicator 44 is fairly close to the first dark band. This fact tells the operator that there is clearance to pass the obstacle, but no turn should be made in the direction of the obstacle.

In FIG. 16, robot 10 has continued forward without altering its course. Right clearance indicator 44 has remained outside the dark band so the operator knows that adequate clearance exists. As an obstacle is passed, both the clearance indicator and the first dark band will rapidly "fall away" toward the side of the arch. This motion may be easily monitored through the operator's ambient visual channel.

Figure 17:
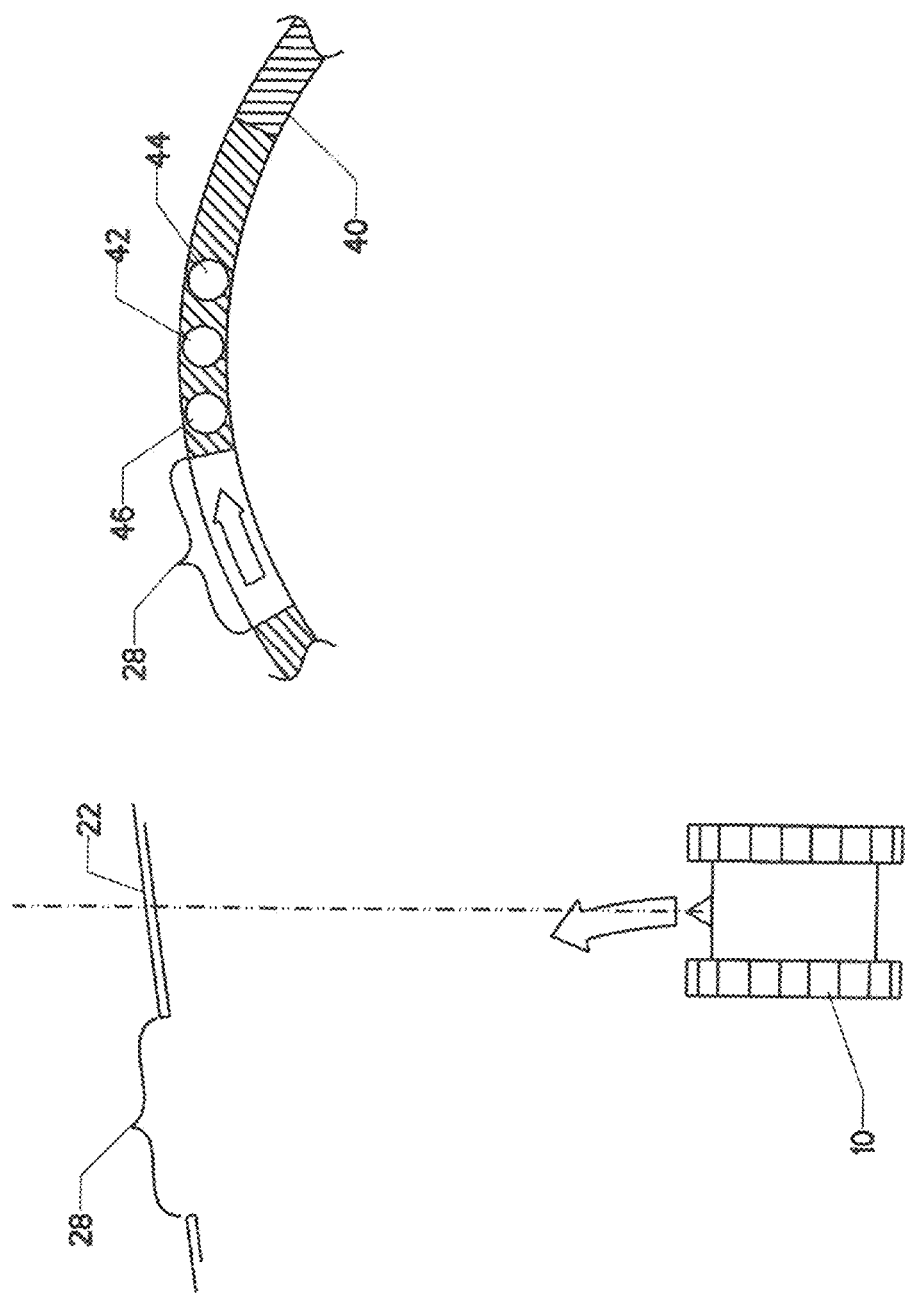
FIG. 17 is a plan view combined with a graphical view, showing the motion of the arch metaphor when the robot is turned.
Figure 18:
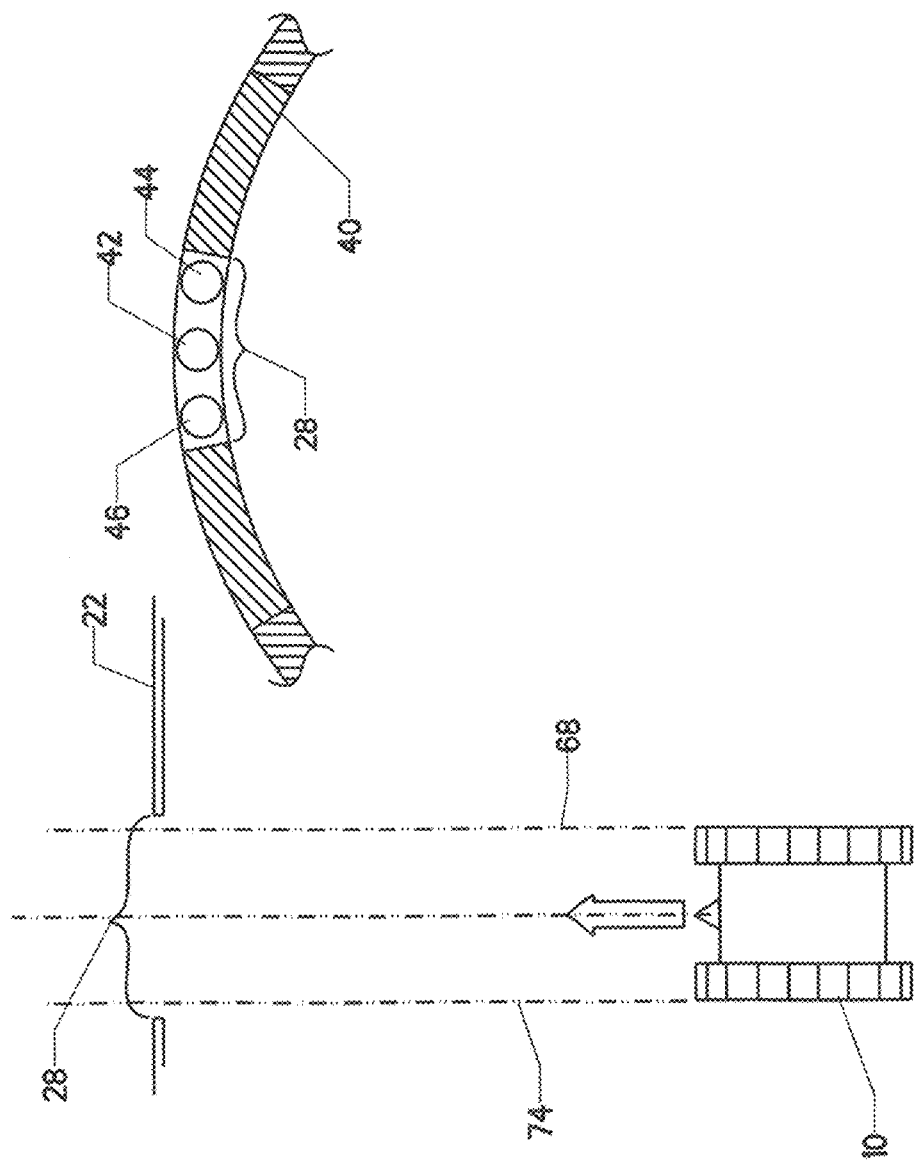
FIG. 18 is a plan view combined with a graphical view, showing how the left and right clearance indicators may be used to determine whether the robot will fit through an opening.

FIGS. 17 and 18 illustrate how the arch metaphor behaves when the vehicle is turned. The reader will again recall that the arch metaphor in this embodiment is driven by a vehicle-based coordinate system. The left side of FIG. 17 shows a plan view in which robot 10 is moving toward wall 22. Wall 22 includes opening 28 through which the operator wishes to drive the robot. The right side of FIG. 17 shows a portion of the arch metaphor (the top portion). Aiming point indicator lies within a shaded region, so the operator knows that if the present course is maintained the robot will strike an obstacle. Both clearance indicators 44, 46 also lie within the shaded region.

However, in viewing the arch metaphor the operator quickly perceives an unshaded region off to the left (corresponding to opening 28). The operator steers toward this opening by turning the robot. As the robot turns, the color-coded regions within the arch metaphor will rotate to the right as shown by the arrow. The operator continues the turn until aiming point indicator 42 is centered in the unshaded region. This is shown in FIG. 18.

The operator will also want to know whether opening 28 is wide enough to allow the robot to pass through. The operator will generally have the video feed available. However—as discussed initially—the operator may or may not be able to judge the clearance situation using the video feed. However, in looking at the arch metaphor, the operator notes that right clearance indicator 44 and left clearance indicator 46 both lie inside the color region corresponding to opening 28. Thus, the operator knows that the robot can pass through the opening. If the opening had been too small, the clearance indicators 44, 46 would have overlapped with the shaded regions bounding the opening. The clearance indicators also provide information regarding whether the vehicle is properly aligned with the opening.

The examples of FIGS. 13-16 only showed the right half of the arch metaphor. In those examples the operator was only considering an object lying off the right side of the vehicle. FIGS. 19 and 20 provide more complete examples by showing objects on both sides of the robot and the full arch metaphor. In FIG. 19A, robot 10 is facing two separate obstacles. Object 60 lies off its right side and is fairly close. Object 78 lies off its left side and is much further away.

The angles $\alpha_1$ and $\alpha_2$ are determined as described previously. The angles $\beta_1$ and $\beta_2$ are determined in the same way with respect to object 78. Closest point 61 is determined using the ranging data. A vector is created between ranging device 36 and closest point 61. A second arc is then created that is centered on ranging device 36 and passes through closest point 61. Left boundary intersection 71 is determined by intersecting the second arc passing through closest point 61 with left boundary projection 74. A vector is then created between ranging device 36 and left boundary intersection 71. The angles $\beta_1$ and $\beta_2$ are thereby established.

Figure 19B:
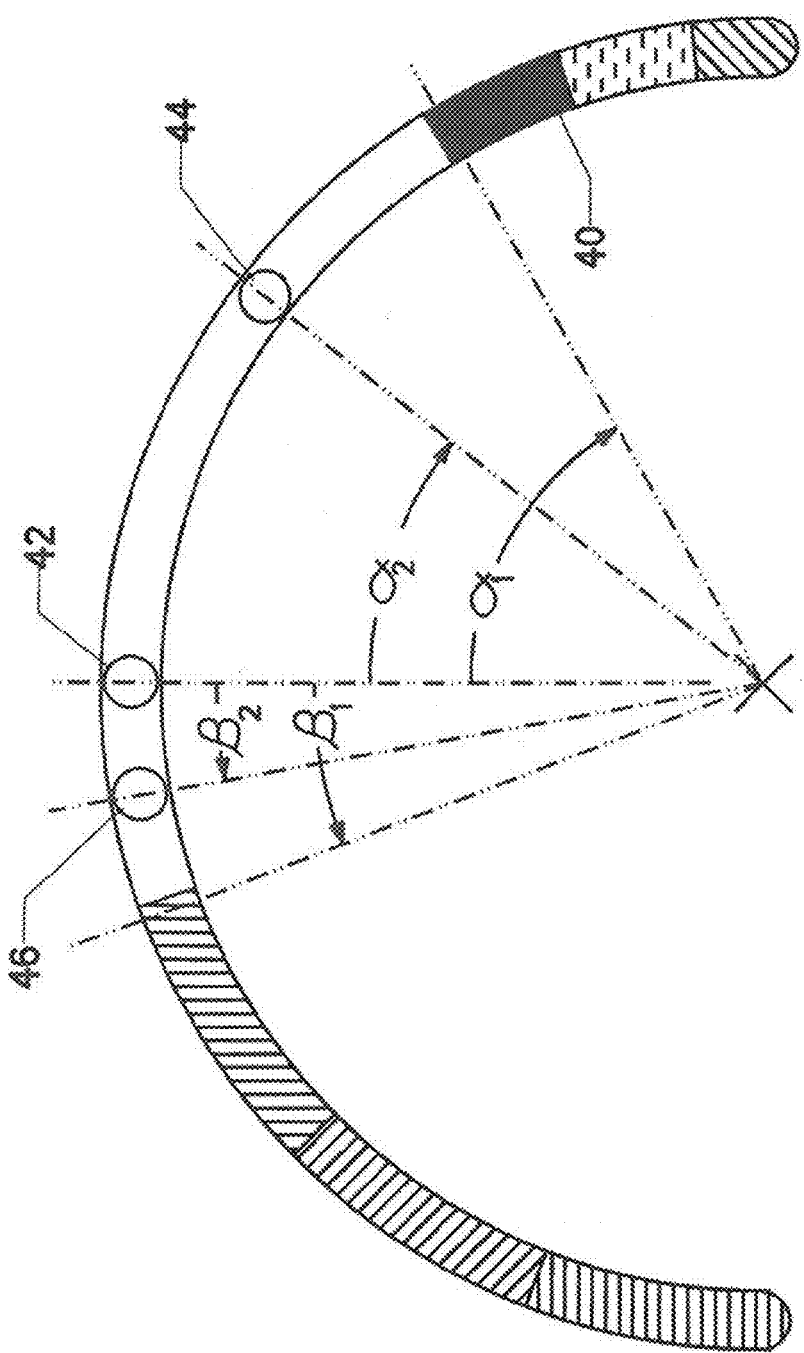
FIG. 19B is a graphical view, showing how the arch metaphor appears when the robot is facing two obstacles.

FIG. 19B shows the configuration of arch metaphor 40 that corresponds to the plan view of FIG. 19A. The angle $\alpha_1$ is used to locate the first dark band on the right side of the arch metaphor. The angle $\alpha_2$ is used to locate right clearance indicator 44. The angle $\beta_1$ is used to locate the first dark band on the left side of the arch. The angle $\beta_2$ is used to locate left clearance indicator 46.

The reader will thereby perceive that the right half of the arch and the left half of the arch operate independently and will often be dissimilar. The information shown in FIG. 19B is again immediately useful to the operator. The operator knows that an obstacle is close to the right of the vehicle, but that there is plenty of clearance to pass the obstacle if the present course is maintained. The operator also knows that there is a more distant object off the left side of the vehicle (and that there is clearance to pass that object as well). This information guides the operator in considering maneuvering options. For example, the operator sees that a right turn maneuver will be available shortly—as soon as the object producing the black band on the right side of the arch is cleared.

Another advantage of the inventive display is its ability to clearly inform the operator when the vehicle has emerged from a corridor or portal. This is a recognized problem with existing video displays. A video feed is often helpful in maneuvering a vehicle down a corridor. However, the boundaries of the corridor move outside the camera field of view before the vehicle emerges from the corridor.

Figure 20B:
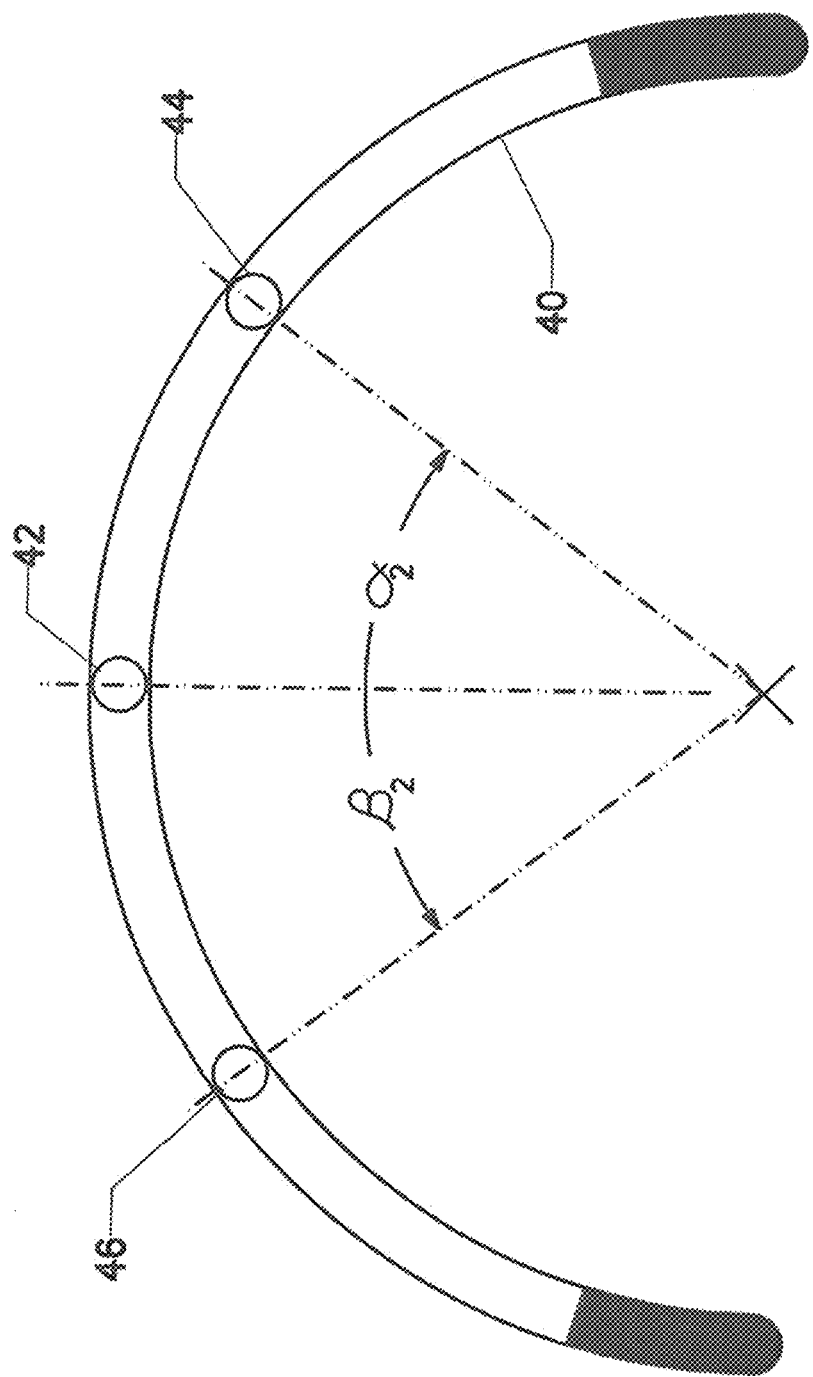
FIG. 20B is a graphical view, showing how the arch metaphor clearly indicates when the robot has passed through a passage.

FIG. 20 demonstrates how the present invention solves this problem. In FIG. 20A, robot 10 is positioned between two objects 76, 78. The graphics show how the angular position of the edges (and the projected right and left boundaries 68, 74) may be determined. FIG. 20B shows the corresponding display on arch metaphor 40. The two black bands representing the objects 76, 78 lie near the outer extremes of the arch. If the operator moves the robot forward at this point, the two black bands will "fall away." The two clearance indicators 44, 46 will also fall away, until such time as the two objects pass behind the vehicle's 180 degree forward scan. When the objects pass behind, the black bands will disappear and the two clearance indicators 44, 46 will "snap" back to their default position adjacent to aiming point indicator 42. This action will be easily seen by the operator, who is thereby informed that the robot has cleared the objects and can maneuver.

In some instances it will be helpful to remind the operator of objects lying close alongside the robot and possibly slightly behind it. FIG. 20C shows some supplementary graphical devices intended to produce this result. FIG. 20C shows the same scenario as in FIGS. 20A and 20B. The reader will note that the two objects 76, 78 already lie outside the view shown on video display 20. The video display shows an open path with no indication of restricted mobility. However, from the plan view of FIG. 20A, it is apparent that the robot can only move straight ahead at this point.

Four proximity bars—two on each side of the video display—are added in this example to assist the operator. The proximity bars may be set to illuminate for any desired ranges of object proximity. In the example depicted, outer proximity bar 86 is illuminated when an object beside the robot is closer than 0.2 m. The outer proximity bar on the right is illuminated to indicate an object on the right side of the robot and the outer proximity bar on the left is illuminated to indicate an object on the left side of the robot. Continuing with the same example, inner proximity bar 88 is illuminated when an object is closer than 0.1 m to the robot (with right and left correspondence as for the outer proximity bars).

Figure 21A:
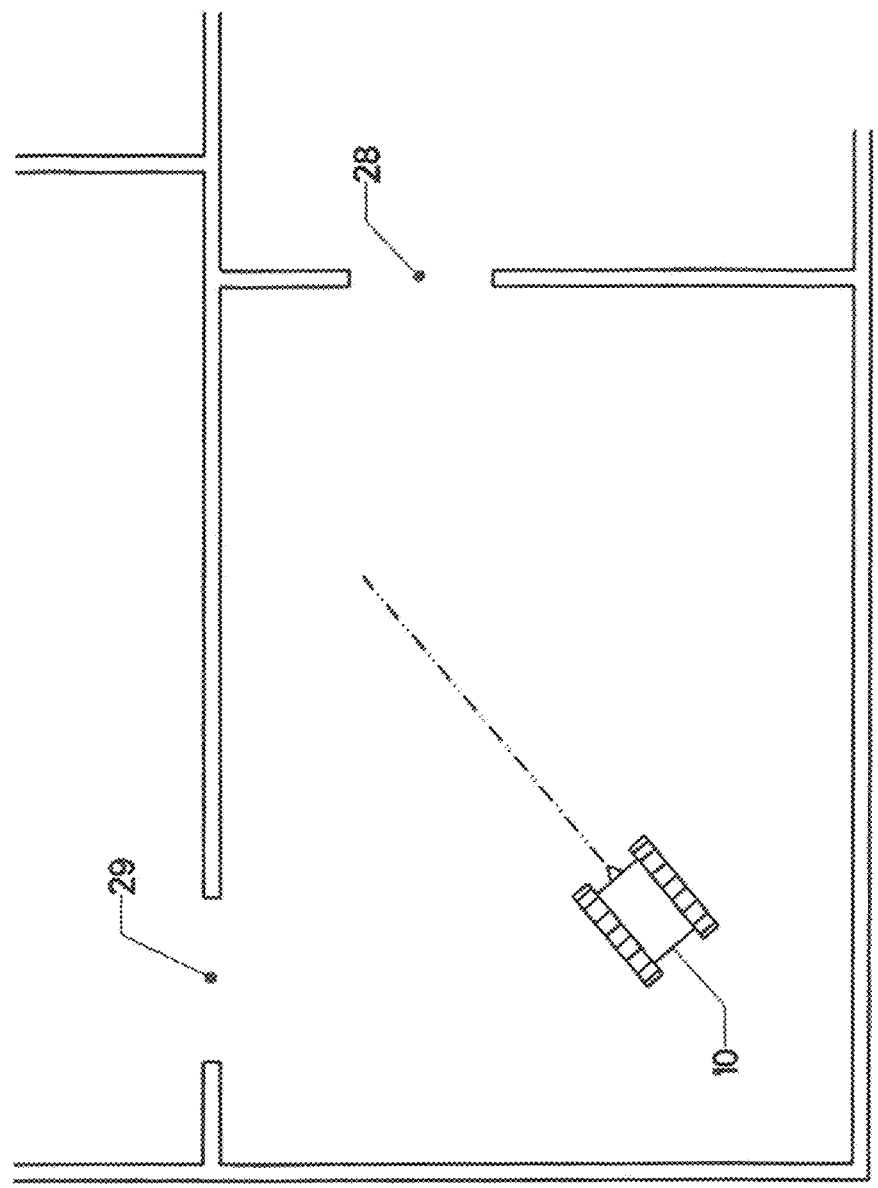
FIG. 21A is a plan view, showing the robot resting in a room with two openings.
Figure 21B:
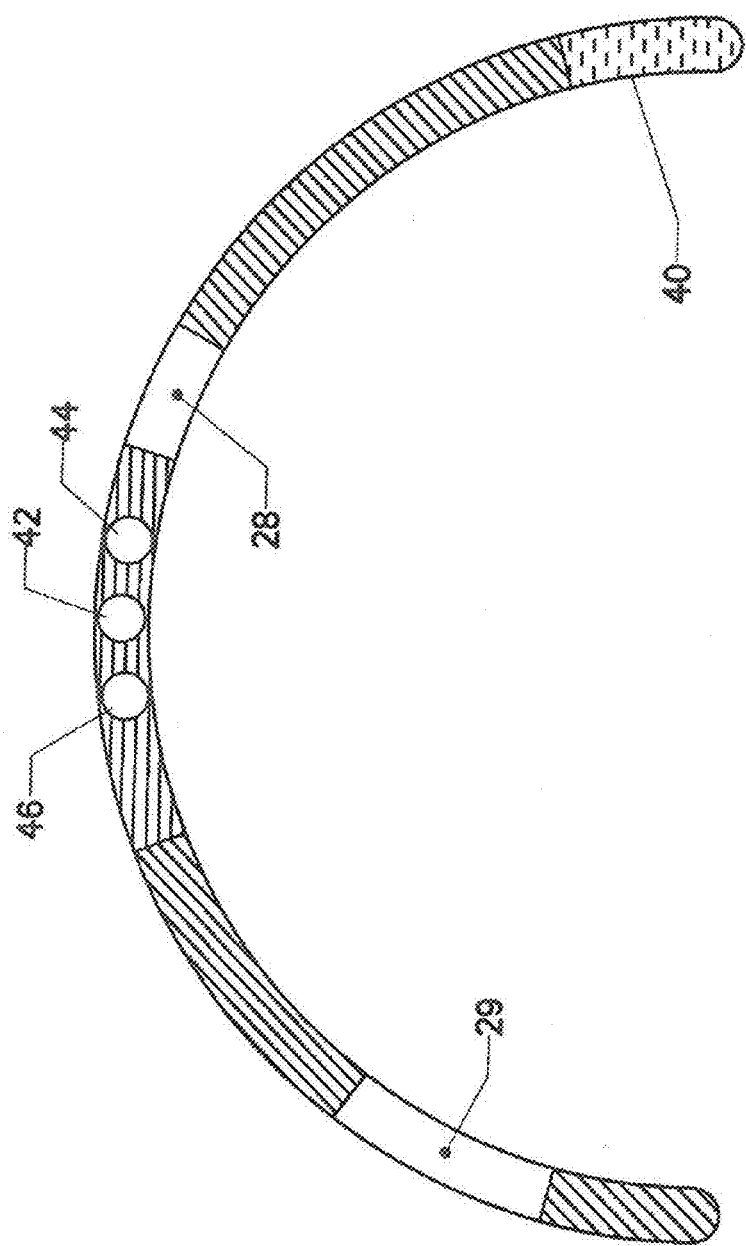
FIG. 21B is a graphical view, showing how the arch metaphor appears when the robot is resting in a room with two openings.

FIG. 21A shows a scenario in which robot 10 is being driven around a building having multiple rooms and passages. The robot is surrounded by walls in a room. Two openings 28, 29 lead out of this room. FIG. 21B shows the display on the arch metaphor corresponding to the scenario of FIG. 21A. The two openings 28, 29 are apparent. It is equally apparent that the operator needs to turn the robot toward an opening as it is not presently aligned with either.

FIG. 21B also demonstrates how the arch metaphor immediately tells the operator whether the vehicle's current orientation relative to a passage is adequate to allow the vehicle to pass through that passage. In studying FIG. 21A, the reader will note that both openings are wide enough to allow the robot through. However, in looking at FIG. 21B, it appears that while opening 29 is wide enough opening 28 is not. This fact immediately informs the operator that the vehicle's current orientation will not allow it to pass through opening 28, and is a significant feature of the present invention.

The reader should bear in mind that the arch metaphor will often be used in conjunction with a video feed. The video feed will inform the operator that opening 28 is being "viewed" obliquely and that the robot should be "squared" to the opening in order to obtain an accurate width measurement. However, it is significant to note that appropriate maneuvering has been demonstrated using the present invention without a video feed. In the example of FIGS. 21A and 21B, the operator lacking a video feed would still realize that there are two openings available and that the larger, safer opening is opening 29. This indicates how the present invention allows the robot to be successfully maneuvered.

Figure 22:
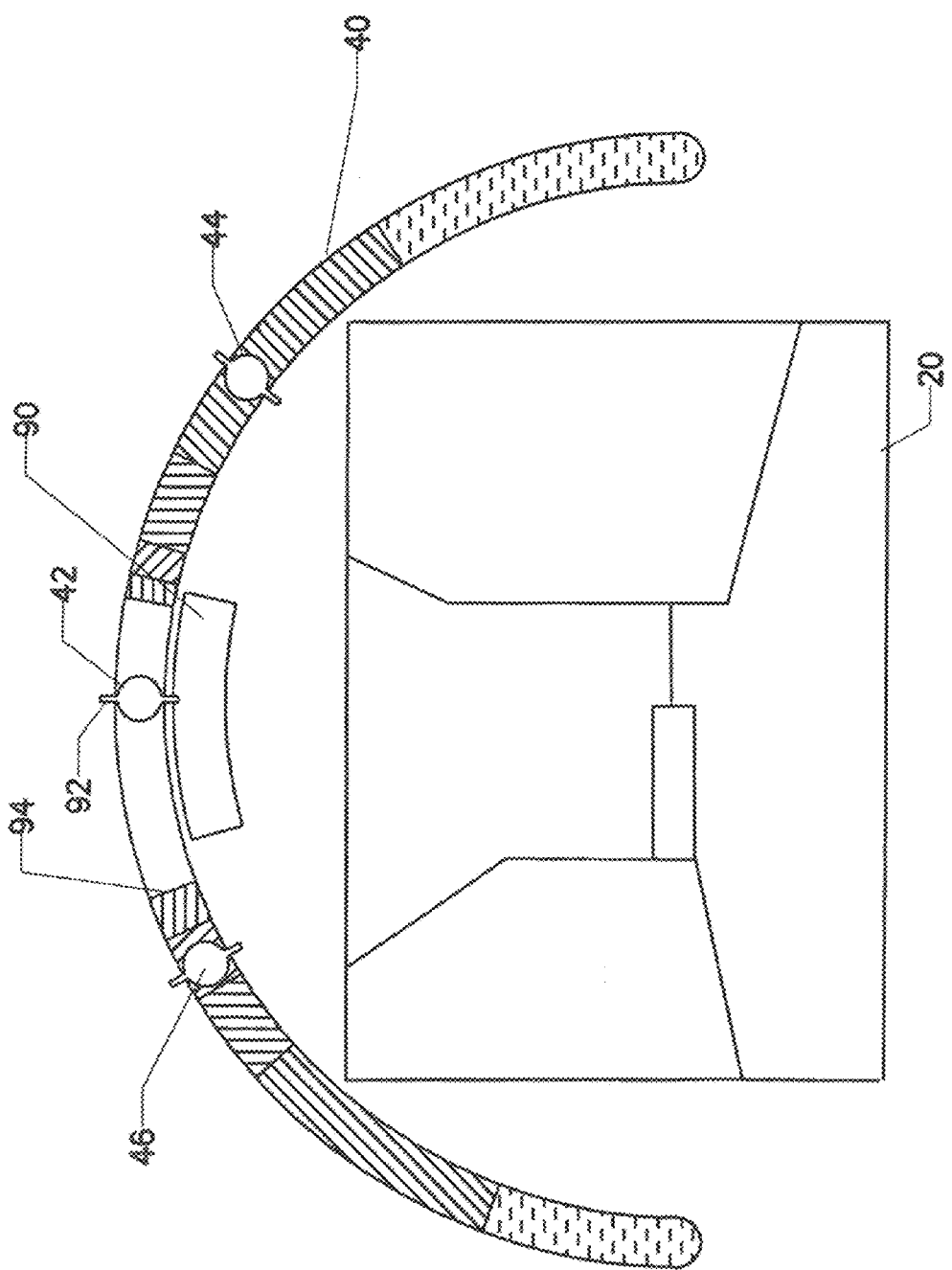
FIG. 22 is a graphical view, showing the addition of a clearance indicator to the arch metaphor.

FIG. 22 depicts additional feature that aid the user in determining whether adequate clearance exists between the vehicle and an obstacle. First, although the simple depiction of the right and left clearance indicators 44, 46 as circles makes their motion easy to perceive, it does not necessarily allow a fine comparison of their position against the position of an object that is a "close fit." This is true because a circle spans a region of the arch metaphor rather than a single point. In order to eliminate this problem, hashmarks 92 are added to aiming point indicator 42, right clearance indicator 44, and left clearance indicator 46.

Each hashmark represents the precise position of the indicator to which it is attached. The user can compare the position of a hashmark against a particular edge 94 (boundary between regions on the arch given a different color code) in order to determine whether or not there is clearance.

An even more rapid clearance determination can be provided with the addition of clearance indicator 90. This graphical object illuminates when the system determines that adequate clearance exists to pass through the portal irrespective of the vehicle's present position and orientation. Clearance indicator may be colored green to rapidly convey that the transition of the portal is possible.

If the system determines that the transition of the portal is not possible, the display could react in other ways. For example, the display could (1) omit clearance indicator 90, (2) show clearance indicator 90 as a "ghosted" outline, or (3) change the color of clearance indicator 90 to red.

The reader will thereby perceive that the present invention rapidly supplies a user with answers to the following questions:

(1) Where are the openings in the immediate environment?
(2) Can I fit through the openings in the immediate environment?
(3) Am I currently aligned to fit through a particular opening?
(4) Have I passed an obstacle or passed through an opening?
(5) Is my current motion (translation and rotation rates) going to avoid the obstacle?

This last point is significant because it considers not only static relationships but also dynamic ones. The motion of the vehicle relative to the obstacle (rather than relative to some arbitrary coordinate system) becomes the crucial element. The interface provides this information by the relationship between the right and left clearance indicators 44, 46 and the darkest band of the arch metaphor (in the context of the gray scale example).

The embodiments discussed have pertained to the control of a moving vehicle but—as explained initially—this is by no means the only application of the invention. Some applications will not involve a vehicle at all. One good example is that of a firefighter using a facemask with a breathing apparatus. The firefighter has limited peripheral vision in this situation, yet is potentially surround on all sides by hazards. The present invention could be incorporated into a display that is projected as a "heads up display" in the facemask itself. There would be no video display 20. That element would be replaced by what the firefighter actually sees looking through the facemask. The arch metaphor and other symbology would then wrap around the firefighter's field of view.

The left and right extremes needed to define right and left clearance indicators 44, 46 could be defined and stored for each individual firefighter. The firefighter maneuvers by using his or her feet rather than operating a vehicle. The inventive display is nevertheless quite useful. Many other applications will occur to those skilled in the art.

There are many variations possible in the details of the present invention beyond the examples provided. For instance, in every example 180 degrees of ranging data has been mapped to 180 degrees of arch metaphor. One can also provide 270 degrees of ranging data mapped to 270 degrees of arch metaphor (though the "arch" in such an instance might more appropriately be called a partial circle). One can even provide 270 degrees of ranging data mapped to 180 degrees of arch metaphor or 360 degrees of ranging data mapped to 360 degrees of arch metaphor.

Further, the correlating of actual radial position for the ranging data need not be a 1 to 1 relationship with the radial position on the arch metaphor. It might in some instances be preferable to make the middle of the arch more sensitive (such as by mapping 20 degrees of ranging data to 40 degrees on the arch) and the edges less sensitive. The correlating could even be made by more complex mathematical functions that may vary according to the circumstances.

The color scales have been illustrated as shades of gray, but this need not always be the case. One could map distant objects to dark blue and close objects to bright red. The color choices are infinitely variable. One may also use many more colors than the seven illustrated. One could use graduations of 256 colors. One could also use an "RGB" scale to create any of millions of colors "on the fly" in the software.

The term video camera as used in this description should be construed broadly to include pixilated devices transmitting signals corresponding to human visual range and beyond. An infrared camera might be used in some instances. In other instances the term "video camera" might include detectors sensitive to things other than electromagnetic energy.

Likewise the term "ranging device" should be broadly construed to include ultrasonic devices, laser-based devices, and even line-scan video cameras. Any device that provides a range to a given point or area meets the definition.

Although the preceding description contains significant detail, it should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

Having described our invention, we claim:

1. A method of providing a display for an operator of a vehicle, said vehicle having a right boundary, a left boundary, a video camera, and a ranging device, comprising:
   a. providing a video display, including a left side, a top, and a right side, wherein said video display displays images from said video camera on said vehicle;
   b. providing an arch metaphor, extending from said left side of said video display, over said top, to said right side of said video display;
   c. displaying ranging data collected by said ranging device on said arch metaphor, wherein,
      i. said ranging data is dividing into ranging sectors,
      ii. each of said ranging sectors is correlated to an arc sector on said arch metaphor,
      iii. a range for each ranging sector is correlated to a color selected from a predefined color scale,
      iv. said ranging data is displayed on said arch metaphor according to said correlated arc sector and said correlated color;
   d. providing a right clearance indicator movable along said arch metaphor, with a position of said right clearance indicator along said arch metaphor being determined by a first amount of clearance between a projected right boundary of said vehicle and a first object that is nearest to a right side of said vehicle; and
   e. providing a left clearance indicator movable along said arch metaphor, with a position of said left clearance indicator along said arch metaphor being determined by a second amount of clearance between a projected left boundary of said vehicle and a second object that is nearest to a left side of said vehicle;
   f. wherein said position of said right clearance indicator is determined on said arch metaphor by
      i. providing a central axis extending outward from said vehicle in a forward direction,
      ii. providing a projected right boundary extending forward from said right boundary of said vehicle,
      iii. of those ranging sectors lying to the right of said central axis, determining a closest point that is closest to said ranging device,
      iv. passing a first range vector arc through said closest point on said right of said central axis,
      v. determining a right boundary intersection lying at the intersection of said first range vector arc and said closest point on said right of said central axis,
      vi. determining a right boundary vector passing from said ranging device through said right boundary intersection,
      vii. using said right boundary vector to control movement of said right clearance indicator along said arch metaphor;
   g. wherein said position of said left clearance indicator is determined on said arch metaphor by
      i. providing a projected left boundary extending forward from said left boundary of said vehicle,
      ii. of those ranging sectors lying to the left of said central axis, determining a closest point that is closest to said ranging device,
      iii. passing a second range vector arc through said closest point on said left of said central axis,
      iv. determining a left boundary intersection lying at the intersection of said second range vector arc and said closest point on said left of said central axis,
      v. determining a left boundary vector passing from said ranging device through said left boundary intersection, and
      vi. using said left boundary vector to control movement of said left clearance indicator along said arch metaphor.

2. A method of providing a display for an operator of a vehicle as recited in claim 1, wherein said color scale comprises shades of gray.

3. A method of providing a display for an operator of a vehicle as recited in claim 1, wherein said arch metaphor includes an aiming point indicator at its center.

4. A method of providing a display for an operator as recited in claim 1, further comprising providing left and right proximity bars that indicate the presence of an object lying close alongside said vehicle.

5. A method of providing a display for an operator of a vehicle, said vehicle having a right boundary, a left boundary, and a ranging device, comprising:
   a. providing an arch metaphor, including an aiming point indicator in its center, wherein said aiming point indicator indicates a current heading of said vehicle;
   b. displaying ranging data collected by said ranging device on said arch metaphor, wherein,
      i. said ranging data is dividing into ranging sectors,
      ii. each of said ranging sectors is correlated to an arc sector on said arch metaphor, iii. a range for each ranging sector is correlated to a color selected from a predefined color scale,
iv. said ranging data is displayed on said arch metaphor according to said correlated arc sector and said correlated color;
c. providing a right clearance indicator movable along said arch metaphor, with a position of said right clearance indicator along said arch metaphor being determined by a first amount of clearance between a projected right boundary of said vehicle and a first object that is nearest to a right side of said vehicle;
d. providing a left clearance indicator movable along said arch metaphor, with a position of said left clearance indicator along said arch metaphor being determined by a second amount of clearance between a projected left boundary of said vehicle and a second object that is nearest to a left side of said vehicle;
e. wherein said position of said right clearance indicator is determined on said arch metaphor by
 i. providing a central axis extending outward from said vehicle in a forward direction,
 ii. providing a projected right boundary extending forward from said right boundary of said vehicle,
 iii. of those ranging sectors lying to the right of said central axis, determining a closest point that is closest to said ranging device,
 iv. passing a first range vector are through said closest point on said right of said central axis,
 v. determining a right boundary intersection lying at the intersection of said first range vector arc and said closest point on said right of said central axis,
 vi. determining a right boundary vector passing from said ranging device through said right boundary intersection,
 vii. using said right boundary vector to control movement of said right clearance indicator along said arch metaphor;
f. wherein said position of said left clearance indicator is determined on said arch metaphor by
 i. providing a projected left boundary extending forward from said left boundary of said vehicle,
 ii. of those ranging sectors lying to the left of said central axis, determining a closest point that is closest to said ranging device,
 iii. passing a second range vector arc through said closest point on said left of said central axis,
 iv. determining a left boundary intersection lying at the intersection of said second range vector arc and said closest point on said left of said central axis,
 v. determining a left boundary vector passing from said ranging device through said left boundary intersection, and
 vi. using said left boundary vector to control movement of said left clearance indicator along said arch metaphor.

6. A method of providing a display for an operator of a vehicle as recited claim 5, wherein said color scale comprises shades of gray.

7. A method of providing a display for an operator of a vehicle as recited in claim 5, wherein said arch metaphor, said right clearance indicator, and said left clearance indicator include a hash mark.

8. A method of providing a display for an operator as recited in claim 5, further comprising providing left and right proximity bars that indicate the presence of an object lying close alongside said vehicle.

\* \* \* \* \*